United States Patent [19]
Adler et al.

[11] Patent Number: 5,868,918
[45] Date of Patent: Feb. 9, 1999

[54] METHOD FOR SEPARATING OXYGEN FROM AN OXYGEN-CONTAINING GAS

[75] Inventors: Stuart Adler; Brett Tamatea Henderson, both of Salt Lake City, Utah; Robin Edward Richards, Lansdale, Pa.; Dale M. Taylor, Salt Lake City; Merrill Anderson Wilson, West Jordan, both of Utah

[73] Assignee: Air Products and Chemicals, Inc., Allentown, Pa.

[21] Appl. No.: 721,640

[22] Filed: Sep. 26, 1996

[51] Int. Cl.[6] .................................. C25B 1/00; C25B 1/02
[52] U.S. Cl. ............................................ 205/615; 205/634
[58] Field of Search ...................... 205/629, 634, 205/615

[56] References Cited

U.S. PATENT DOCUMENTS

| | | | |
|---|---|---|---|
| 4,131,514 | 12/1978 | Chong et al. | 205/634 |
| 4,253,925 | 3/1981 | Mason | 205/629 X |
| 4,547,281 | 10/1985 | Wang et al. | 204/424 |
| 4,877,506 | 10/1989 | Fee et al. | 204/242 |
| 4,879,016 | 11/1989 | Joshi | 205/634 X |
| 4,885,142 | 12/1989 | Suitor et al. | 423/219 |
| 5,021,137 | 6/1991 | Joshi et al. | 204/242 |
| 5,045,169 | 9/1991 | Feduska et al. | 204/258 |
| 5,186,806 | 2/1993 | Clark et al. | 204/265 |
| 5,269,902 | 12/1993 | Khandkar et al. | 204/421 |
| 5,298,138 | 3/1994 | Nachles et al. | 204/267 |
| 5,302,258 | 4/1994 | Renlund et al. | 204/129 |
| 5,332,483 | 7/1994 | Gordon | 204/265 |
| 5,338,623 | 8/1994 | Nachlas et al. | 429/31 |
| 5,378,345 | 1/1995 | Taylor et al. | 204/421 |
| 5,385,874 | 1/1995 | Renlund et al. | 501/103 |
| 5,409,371 | 4/1995 | Gordon | 431/127 |
| 5,441,610 | 8/1995 | Runlund et al. | 204/129 |

FOREIGN PATENT DOCUMENTS

| | | | |
|---|---|---|---|
| 682379A1 | 5/1995 | European Pat. Off. | H01M 8/24 |
| 72200743 | 1/1994 | Japan . | |

OTHER PUBLICATIONS

Headley, T.J. and Leohman, R. E., "Crystallization of a Glass–Ceramic by Epitaxial Growth", *Journal of the American Ceramic Society*, vol., 67, No. 9, pp. 620–625, Sep. 1984.

Richerson, D. W., *Modern Ceramic Engineering*, 2nd Edition, Marcel Dekker, Inc., New York, pp. 204, 205, 206, 228, 1992 (No Month).

J. W. Suitor et al., "Oxygen Separation From Air Using Zirconia Solid Electrolyte Membranes", *Proceedings of the 23rd Intersociety Energy Conversion Conference*, vol. 2, ASME, New York, 1988, pp. 273–277 No Month.

D. J. Clark et al., "Separation of Oxygen by Using Zirconia solid Electrolyte Membranes", *Gas Separation and Purification*, 1992, vol. 6, No. 4, pp. 201–205 No Month.

C. J. Morrissey, "Stacking Oxygen Separation Cells", *NASA Tech Brief*, vol. 15, No. 6, Item #25, Jun. 1991.

C.J. Morrissey, "Thinner, More Efficient Oxygen Separation Cells", *NASA Tech Brief*, vol. 17, No. 4, Item #100, Apr. 1993.

*Primary Examiner*—Donald R. Valentine
*Attorney, Agent, or Firm*—John M. Fernbacher

[57] ABSTRACT

An electrochemical device for separating oxygen from an oxygen-containing gas comprises a plurality of planar ion-conductive solid electrolyte plates and electrically-conductive gas-impermeable interconnects assembled in a multi-cell stack. Electrically-conductive anode and cathode material is applied to opposite sides of each electrolyte plate. A gas-tight anode seal is bonded between the anode side of each electrolyte plate and the anode side of the adjacent interconnect. A biasing electrode, applied to the anode side of each electrolyte plate between the anode seal and the edge of the anode, eliminates anode seal failure by minimizing the electrical potential across the seal. The seal potential is maintained below about 40 mV and preferably below about 25 mV. A gas-tight seal is applied between the cathode sides of each electrolyte plate and the adjacent interconnect such that the anode and cathode seals are radially offset on opposite sides of the plate. The combination of biasing electrodes and offset seals is particularly effective in eliminating anode seal failure.

12 Claims, 14 Drawing Sheets

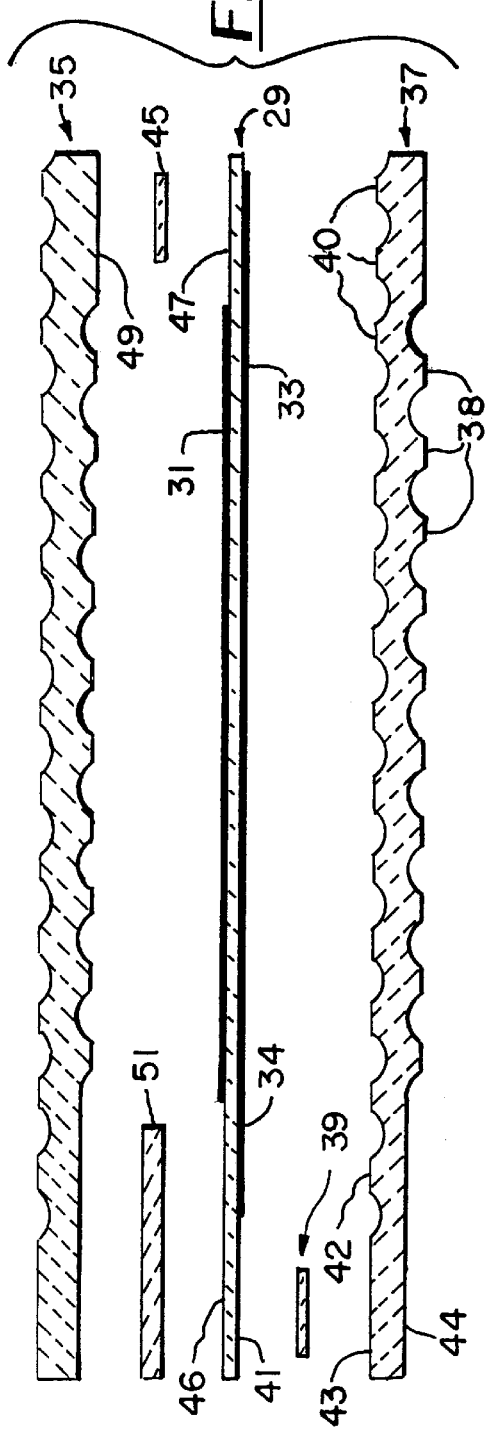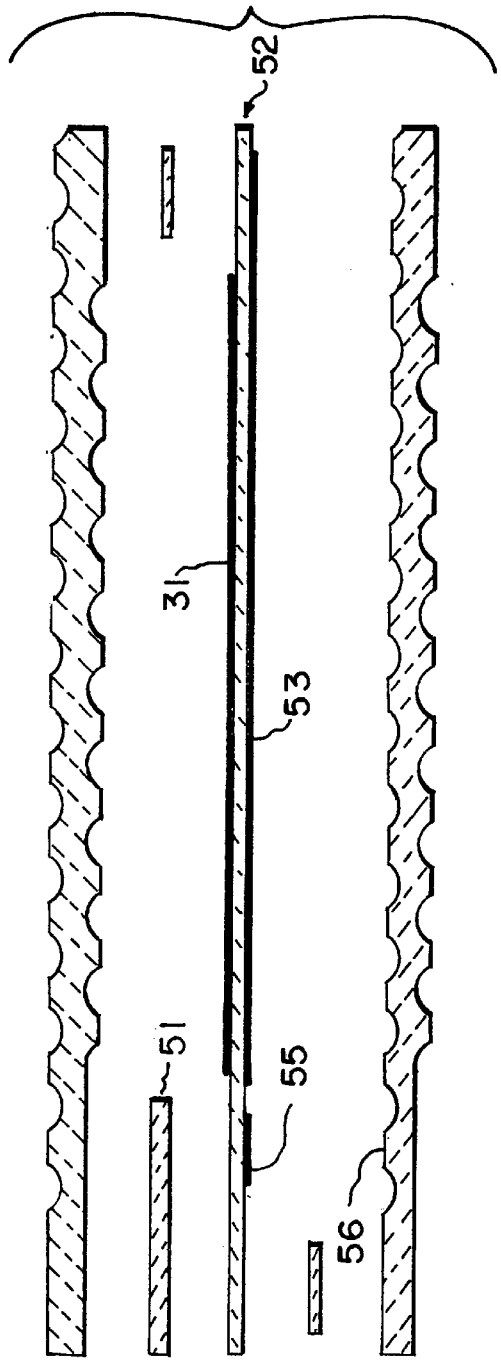

FIG. II

METHOD FOR SEPARATING OXYGEN FROM AN OXYGEN-CONTAINING GAS

TECHNICAL FIELD OF THE INVENTION

The invention pertains to an electrochemical device for the recovery of oxygen from an oxygen-containing gas, and in particular to an improved stack design for planar series electrolytic cells.

BACKGROUND OF THE INVENTION

Ion-conducting inorganic oxide ceramic materials of certain compositions transport or permeate ions at high temperatures, and this phenomenon is the basis for practical applications in fuel cells, gas analysis and monitoring, and the separation of gas mixtures. In a number of such practical applications, oxygen ions migrate as current under an imposed potential gradient through an oxygen ion-conducting electrolyte from the cathode side, where oxygen ions are generated by reduction of oxygen or other gases, to the anode or oxygen side, where the oxygen ions are consumed to form oxygen or other gases.

Oxygen ion-conducting solid electrolytes can be constructed in tubular, flat plate, and honeycomb or monolith multicell configurations. The flat plate configuration, in which a plurality of planar electrolytic cells are stacked to operate in electrical series, is favored in many applications for ease of assembly and compact dimensions. The practical application of ion conductor systems for gas separation, regardless of design configuration, requires that the cells operate under a differential pressure and/or differential gas composition between the feed side (cathode) and the permeate side (anode). In the separation of oxygen from an oxygen-containing gas, for example, the pressure and/or gas composition of the oxygen-containing feed gas and the oxygen-depleted discharge gas (also defined as nonpermeate gas) can differ from the pressure and/or gas composition of the oxygen produced at the anode (also defined as permeate gas), depending on the stack design and product requirements. Gas-tight seals between selected structural components of the system therefore are required to maintain product gas purity, whether the product is oxygen-depleted discharge gas or high purity oxygen produced at the anode.

An oxygen ion-conducting system having a disk or planar stack configuration is described in U.S. Pat. No. 4,885,142 in which an oxygen-containing gas is introduced through axial feed ports, flows radially across stacked electrolyte disks, and is discharged through an axial discharge port preferably centrally located. Oxygen product is withdrawn through a separate series of axial discharge ports. The feed and product gases are segregated by interfitting parts of the disk assembly, which is described to form a substantially sealing relationship. The stack operates with no differential pressure across the cells and the use of sealants is not disclosed. A similar system is disclosed in papers by J. W. Suitor et al entitled "Oxygen Separation From Air Using Zirconia Solid Electrolyte Membranes" in *Proceedings of the 23rd Intersociety Energy Conversion Conference,* Vol. 2, ASME, New York, 1988, pp. 273–277, and by D. J. Clark et al entitled "Separation of Oxygen By Using Zirconia Solid Electrolyte Membranes" in *Gas Separation and Purification,* 1992, Vol.6, No. 4, p. 201–205.

U.S. Pat. No. 5,186,806 discloses a planar solid electrolyte cell configuration in which alternating plates and gas distribution support members are stacked in series. In one configuration the plates are made of ion-conducting non-porous material and the support members are made of non-porous electrically-conducting material. A series of ports and bosses in the support members coincide with ports in the electrolyte plates to yield a flow configuration in which feed air flows radially across the cathode sides of the electrolyte plates in an inward direction, and the oxygen-depleted air is withdrawn axially through a centrally-located conduit formed by congruent ports in the electrolyte plates and support members. Oxygen formed on the anode sides of the electrolyte plates flows radially outward and is withdrawn through a plurality of axial conduits formed by separate congruent ports in the electrolyte plates and distribution members. Sealing between the oxygen side and feed gas sides of the stack components according to the disclosure is accomplished by direct contact between electrolyte plates and flat bosses on the support members, and also at the stack periphery by contact between continuous flat raised rings on the support members and the flat electrolyte plates. No sealant is described in the seal regions formed by direct contact between regions of the support members and the electrolyte plates. The seal regions formed by the bosses in contact with the anode side and the cathode side of each electrolyte plate are radially and circumferentially offset, but the corresponding peripheral seals are congruent or directly opposed.

An ion conducting device having a plurality of electrolyte plates in a stacked configuration is disclosed in U.S. Pat. No. 5,298,138 in which supporting electrically-conducting interconnects are not used. The electrolyte plates are separated by alternating spacers made of electrolyte material which is attached near the edges of the plates by glass sealant to allow crossflow feed. While this stack design is simplified by eliminating interconnects, the electrolyte plates are not supported in the central region, which allows operation only at very small pressure differentials between the anode and cathode sides of the cells.

European Patent Application Publication No. 0 682 379 A1 discloses a series planar electrochemical device for gas separation in which alternating electrolyte plates and electrically-conducting interconnects are assembled in a stack configuration. The anode and cathode in electrical contact with opposite sides of each electrolyte plate are radially coextensive, i.e. congruent. The interconnects contain channels designed such that feed gas flows through the cathode side in crossflow mode and oxygen formed on the anode side is withdrawn in a crossflow mode in a flow direction perpendicular to the feed gas flow. The interconnects and electrolyte plates are connected by glass sealing areas parallel to the channels in the interconnects. Portions of the anode and cathode seals are directly opposed on each electrolyte plate.

A technical report entitled "Stacking Oxygen Separation Cells" by C. J. Morrissey in *NASA Tech Brief,* Vol. 15, No. 6, Item #25, June 1991 describes planar stacked electrolyte cells comprising alternating electrolyte plates and gas distribution interconnects. The anode and cathode on each electrolyte plate are directly opposed across the electrolyte plate, i.e., they are congruent. Glass seals are used between each electrolyte plate and the adjacent interconnects, and the seals are directly opposed across the electrolyte plate, i.e., they are congruent. This design includes a nonporous electrically insulating layer located at the edge of the stack between the interconnects.

Planar stacked electrolyte cells comprising alternating electrolyte plates and interconnects having embossed gas passageways are disclosed in a technical report entitled "Thinner, More Efficient Oxygen Separation Cells" by C. J. Morrissey in *NASA Tech Brief,* Vol. 17, No. 4, Item #100, April 1993. Air is introduced into the cells through axial manifolds passing through the stack which provide feed in radial flow across the cathode sides of the cells. Oxygen-depleted air is withdrawn through a centrally-located axial manifold. Oxygen product from the anode sides of the cells is withdrawn through additional axial manifolds passing through the stack at locations circumferentially disposed between the air feed manifolds. The anode and cathode on each electrolyte plate appear to be directly opposed across the electrolyte plate, i.e., they are congruent. While seals are not specifically discussed in the text, it appears from the drawings that seals between each electrolyte plate and the adjacent interconnects would be directly opposed across the electrolyte plate, i.e., they are congruent.

Thus the state of the art in the design of stacked ion-conducting electrolytic cells teaches methods for sealing the anode and cathode sides of the cells to prevent cross-contamination of feed and product gases. Sealing has proved difficult, however, at the high temperatures and electro-chemically active conditions encountered in these systems. The practical application of ion conductor systems for gas separation, regardless of design configuration, requires that the cells operate under differential pressures and/or differential gas compositions between the feed and product sides of the cells, and this in turn requires robust gas-tight seals between the stack components. This need is addressed in the invention which is described in the specification below and defined by the claims which follow.

SUMMARY OF THE INVENTION

The invention is a method for separating oxygen from an oxygen-containing gas which comprises contacting the oxygen-containing gas with a first surface of a planar solid electrolyte capable of transporting oxygen ions, supplying electrons to the first surface of the solid electrolyte by a cathode in electrical contact with a portion of the first surface, and electrochemically reducing oxygen in the oxygen-containing gas by consuming electrons to produce oxygen ions. The resulting oxygen ions are transported as current through the solid electrolyte by imposing an electrical potential across the planar solid electrolyte, and oxygen gas is produced at a second surface of the solid electrolyte by consuming oxygen ions and producing electrons. The electrons are conducted from the second surface by an anode in electrical contact with a portion of the second surface, and the electrons are conducted from the anode by a gas impermeable electrically conducting interconnect which is in electrical contact with the anode. Oxygen gas is collected in a cavity bounded at least in part by the second surface of the solid electrolyte, the gas impermeable electrically conducting interconnect, and a gas-tight anode seal disposed between a portion of the second surface of the solid electrolyte and an opposing portion of the electrically conducting interconnect. Oxygen gas is withdrawn from the cavity and an oxygen-depleted gas is withdrawn from contact with the first surface of the planar solid electrolyte. The anode seal potential is maintained below about 40 mV, preferably by one or more biasing electrodes. At least one of the biasing electrodes may be an extended portion of the anode or alternatively may be an electrode which is separate from the anode. Both types of biasing electrodes may be employed concurrently. Preferably at least one of the biasing electrodes is disposed between the anode and the anode seal. Optionally at least one of the biasing electrodes is not disposed between the anode and the anode seal.

The pressure of the oxygen gas generated at the second surface of the solid electrolyte may be different than the pressure of the oxygen-containing gas at the first surface of the solid electrolyte. In one embodiment, the oxygen-containing gas comprises air, and the oxygen gas is withdrawn as a high purity pressurized product at a pressure at least 5 kPa greater than the pressure of the oxygen-containing gas. Alternatively the oxygen-containing gas contains less than 20.9 vol % oxygen. In another embodiment, the oxygen-containing gas comprises argon and an argon product depleted in oxygen is withdrawn after contacting the oxygen-containing gas with the first surface of the solid electrolyte and after the oxygen is removed by reduction (ionization) and transport across the solid electrolyte. The argon product may be obtained at a pressure equal to or greater than the pressure of the oxygen gas in the cavity formed by the anode sides of the electrolyte plate and interconnect.

The invention includes an electrolyte plate for a planar electrolytic cell useful for the separation of oxygen from an oxygen-containing gas mixture, wherein the electrolyte plate has an anode side and a cathode side, and wherein the planar electrolytic cell comprises the electrolyte plate, a surface of a first electrically-conductive gas-impermeable interconnect in electrical contact with the cathode side of the electrolyte plate, and a surface of a second electrically-conductive gas-impermeable interconnect in electrical contact with the anode side of the electrolyte plate. The electrolyte plate comprises (a) a planar solid electrolyte capable of transporting oxygen ions, (b) an anode in electrical contact with one surface of the planar solid electrolyte, (c) a cathode in electrical contact with the opposite surface of the planar solid electrolyte, and (d) one or more biasing electrodes. A biasing electrode is defined as any electrode material which is in electrical contact with the electrolyte plate, is located on an area of the electrolyte plate such that the area has no cathode material on the opposite side thereof, and is in electrical contact with the second electrically-conductive gas-impermeable interconnect.

The electrolyte plate may have at least one biasing electrode which is an extended portion of the anode, or alternatively at least one of the biasing electrodes can be separate from the anode. The electrolyte plate also has a gas tight seal between the cathode side of the electrolyte plate and the surface of the first electrically-conductive gas-impermeable interconnect wherein the gas tight seal comprises electrically insulating material.

The invention also is a planar electrolytic cell useful for the separation of oxygen from an oxygen-containing gas mixture which comprises:

(a) a solid electrolyte plate capable of transporting oxygen ions, wherein the plate has an anode side and cathode side;

(b) a first electrically-conductive gas-impermeable interconnect having a cathode side in electrical contact with the cathode side of the electrolyte plate;

(c) a second electrically-conductive gas-impermeable interconnect having an anode side in electrical contact with the anode side of the electrolyte plate;

(d) a first cavity defined at least in part by the cathode side of the electrolyte plate, the cathode side of the first interconnect, and one or more gas-tight cathode seals disposed therebetween; and (e) a second cavity defined at least in part by the anode side of the electrolyte plate, the anode side of the second interconnect, and one or more gas-tight anode seals disposed therebetween.

Each of the one or more anode seals is completely offset with respect to each of the one or more cathode seals on opposite sides of the electrolyte plate, such that the projection of each anode seal onto the cathode side of the electrolyte plate does not overlap any of the one or more cathode seals.

The invention also is an electrochemical device for separating oxygen from an oxygen-containing gas which comprises a plurality of planar solid electrolyte plates capable of transporting oxygen ions, each plate having an anode side, a cathode side, an outer edge, and an opening through the plate disposed in an interior region of the plate, wherein the anode side has an anode in electrical contact therewith and surrounded by a continuous peripheral unelectroded region between the outer edge of the plate and the anode. The device includes a plurality of planar, gas-impermeable, electrically-conductive interconnects each having an anode side, a cathode side, an outer edge, and at least one opening therethrough in an interior region thereof. The anode side has a continuous peripheral flat region adjacent to the outer edge, and one or more gas passages formed by an interconnected depression in the anode side which passages are disposed between the peripheral flat region and the opening and are in flow communication with the opening.

The electrolyte plates and the interconnects are stacked alternately to form a stack of planar electrolytic cells electrically connected in series, each cell defined by an electrolyte plate, the anode side of a first interconnect in electrical contact with the anode side of the electrolyte plate, and the cathode side of a second interconnect in electrical contact with the cathode side of the electrolyte plate. An anode seal is disposed between and bonded to the continuous peripheral unelectroded region of the anode side of the electrolyte plate and the continuous peripheral flat region adjacent to the outer edge of the anode side of the first interconnect, which defines at least in part an oxygen collection cavity for the collection of oxygen gas formed at the anode side of the electrolyte plate. One or more biasing electrodes are in electrical contact with the anode side of each electrolyte plate, and a grounding rib is formed on the anode side of each interconnect as a continuous or discontinuous raised ridge surrounding the one or more gas passages formed by an interconnected depression in the anode side of the interconnect. The grounding rib contacts at least one of the one or more biasing electrodes.

The device includes means for providing an electrical potential across the plurality of planar electrolytic cells which provides electron flow between adjacent cells through the interconnects, means for introducing the oxygen-containing gas into the stack of electrolytic cell, means for withdrawing oxygen gas from the stack of electrolytic cells; and means for withdrawing oxygen-depleted gas from the stack of electrolytic cells. At least one of the one or more biasing electrodes can be an extended portion of the anode, or alternatively at least one of the biasing electrodes can be separate from the anode and disposed between the anode and the anode seal.

In this device, the cathode side of each electrolyte plate has a continuous peripheral unelectroded region adjacent to the outer edge of the plate and another continuous unelectroded region surrounding the opening, and the cathode is disposed between the unelectroded regions. The cathode side of each interconnect has a continuous peripheral flat region adjacent to the outer edge, a raised continuous flat region surrounding the opening, and one or more gas passages formed in the cathode side by a plurality of raised areas which are disposed between the peripheral flat region and the flat region surrounding the opening, wherein the raised areas and the raised continuous flat region are coplanar, and wherein the gas passages are in flow communication with portions of the continuous flat region adjacent to the outer edge. A cathode seal is disposed between and bonded to the raised continuous flat region surrounding the opening in the cathode side of the interconnect and the continuous unelectroded region on the cathode side of the electrolyte plate surrounding the opening therethrough, which forms a partially closed cavity through which the oxygen-containing gas flows.

In an embodiment of the device, electrically insulating support material disposed between the continuous peripheral unelectroded region of the cathode side of each electrolyte plate and the continuous peripheral flat region adjacent to the outer edge of the cathode side of each adjacent interconnect. The insulating support material is disposed such that a cavity is formed in each electrolytic cell at least in part by the insulating support material, the cathode side of an electrolyte plate, the cathode side of an adjacent interconnect, and the cathode seal such that the cavity is in flow communication with the means for introducing the oxygen-containing gas into the stack of electrolytic cells and the means for withdrawing oxygen-depleted gas from the stack of electrolytic cells. The openings in each electrolyte plate and each interconnect in conjunction with the cathode seals form an axial passageway through the stacked electrolyte plates and interconnects, which passageway is in flow communication with the oxygen collection cavities, and wherein the axial passageway provides for the withdrawal of oxygen gas.

The invention includes a material suitable for use as an electrically insulating support between an electrically-conducting interconnect and an electrolyte in an electrochemical device for separating oxygen from an oxygen-containing gas. The material is made by firing a mixture comprising inorganic oxide glass or glass-ceramic combined with one or more electrically insulating ceramics at above about 700° C., wherein the coefficient of thermal expansion of the mixture after firing differs from the coefficient of thermal expansion of the electrolyte or the coefficient of thermal expansion of the interconnect by less than about 2 micrometer/(meter$\Omega$°C.). In one embodiment, the mixture comprising inorganic oxide glass or glass-ceramic combined with one or more electrically insulating ceramics before firing contains about 0.3 to about 27 wt % of a lithium aluminosilicate glass in admixture with the insulating ceramics magnesia (MgO) and alumina ($Al_2O_3$), and the weight ratio of magnesia to alumina in the mixture before firing is between about 0.2 and about 8.

The invention also includes a method for making a material suitable for use as an electrically insulating support between an electrically-conducting interconnect and an electrolyte in an electrochemical device for separating oxygen from an oxygen-containing gas which comprises firing a mixture comprising inorganic oxide glass or glass-ceramic combined with one or more electrically insulating ceramics at above about 700° C. to yield an electrically insulating support material having a coefficient of thermal expansion which differs from the coefficient of thermal expansion of the electrolyte or the coefficient of thermal expansion of the interconnect by less than about 2 micrometer/(meter$\Omega$°C.). In one embodiment, the mixture which comprises the inorganic oxide glass or glass-ceramic combined with one or more electrically insulating ceramics contains about 0.3 to about 27 wt % of a lithium aluminosilicate glass in admixture with the insulating ceramics magnesia (MgO) and alumina ($Al_2O_3$), and the weight ratio of magnesia to alumina in the mixture before firing is between about 0.2 and about 8.

Another embodiment of the invention is a material suitable for use as an electrically insulating support between an electrically-conducting interconnect and an electrolyte in an electrochemical device for separating oxygen from an oxygen-containing gas which material is made by sintering a mixture comprising one or more electrically insulating ceramics to yield an electrically insulating support material having a coefficient of thermal expansion which differs from the coefficient of thermal expansion of the electrolyte or the coefficient of thermal expansion of the interconnect by less than about 1 micrometer/(meter$\Omega$°C.). A representative mixture of insulating ceramics comprises magnesia (MgO) and alumina ($Al_2O_3$) having a composition such that the weight ratio of magnesia to alumina in the mixture before sintering is between about 0.2 and about 8.

An alternative embodiment is a method for making a material suitable for use as an electrically insulating support between an electrically-conducting interconnect and an electrolyte in an electrochemical device for separating oxygen from an oxygen-containing gas which comprises sintering a mixture comprising one or more insulating ceramics to yield an electrically insulating support material having a coefficient of thermal expansion which differs from the coefficient of thermal expansion of the electrolyte or the coefficient of thermal expansion of the interconnect by less than about 1 micrometer/(meter$\Omega$°C.). The mixture before sintering may comprise magnesia (MgO) and alumina ($Al_2O_3$) having a composition such that the weight ratio of magnesia to alumina in the mixture before firing is between about 0.2 and about 8. The method optionally includes bonding the electrically insulating support material to the electrolyte by cofiring the electrically insulating support material with the electrolyte at temperatures sufficient to bond the insulating support directly to the electrolyte. Alternatively, the electrically insulating support material can be bonded to the electrolyte and the interconnect by placing inorganic oxide glass or glass-ceramic between the insulating support and the electrolyte, placing inorganic oxide glass or glass-ceramic between the insulating support and the interconnect, and firing at a temperature sufficient to bond the insulating support to both the electrolyte and the interconnect. The inorganic oxide glass or glass-ceramic can be a lithium aluminosilicate glass.

BRIEF DESCRIPTION OF THE DRAWINGS

FIGS. 6A and 6B are exploded section views which include single electrolytic cells.

DETAILED DESCRIPTION OF THE INVENTION

Figure 1:
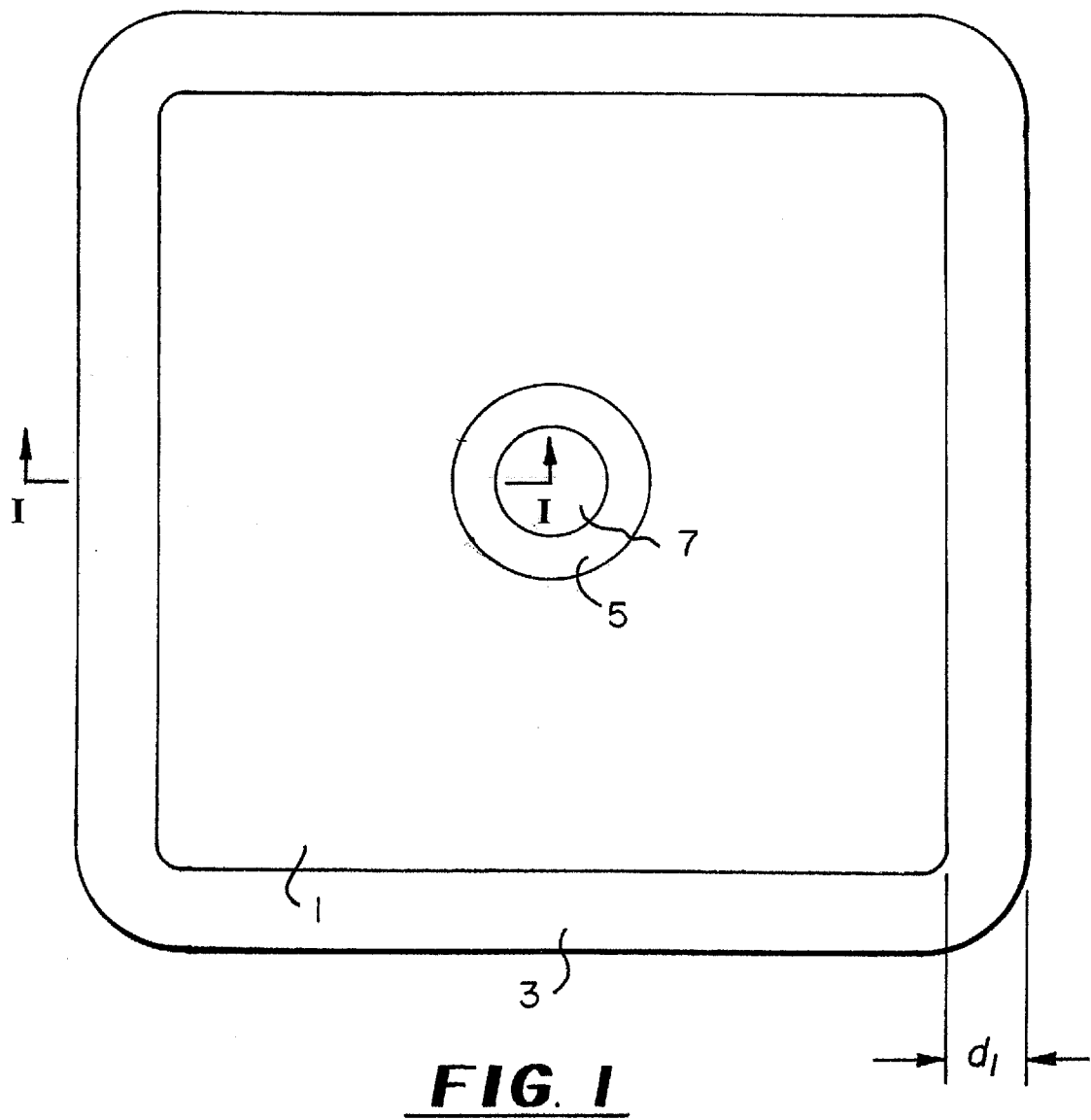
FIG. 1 is a plan view of the cathode side of an electrolyte plate of the present invention.

Separation devices based on oxygen ion-conducting solid electrolytes have practical applications in the production of high-purity oxygen from air and in the removal of residual oxygen from inert gases such as argon or nitrogen. In either application, the solid electrolyte is operated with a difference in gas pressure and/or gas composition between the feed (cathode) side and the product or permeate (anode) side of the electrolyte. The strength of the components in such a separation device and the stability of the required gas-tight seals between these components must be sufficient to sustain practical pressure and/or composition differentials over the economic lifetime of the device.

Separation devices based on oxygen ion-conducting solid electrolytes can be constructed in tubular, flat plate, and honeycomb or monolith configurations. The flat plate configuration, in which a plurality of planar electrolyte cells are stacked to operate in electrical series, is favored in many applications for ease of assembly, cost effectiveness, and compact dimensions. The flat plate configuration must be designed with the appropriate component strength and seal integrity to operate at a pressure differential and/or gas composition differential between feed and product gas streams while maintaining purity requirements of the product gas stream. The present invention utilizes a flat plate stack design and method of operation which meets these requirements.

Difficulties have been experienced in the past in maintaining such seals as reported in the cited references of the prior art summarized above. Anode seal failure readily occurs in stack designs in which the seals on the anode and cathode sides of the electrolyte plate are directly opposed. This failure was observed as delamination at the interface between the seal material and the anode side of the electrolyte plate. It is believed that this seal failure may be the result of stray or residual anodic current passing through the seal.

In the present invention, several improvements in the stack design were identified which reduce or eliminate anode seal failure. One of these improvements is the use of one or more biasing electrodes in contact with each electrolyte plate which modify or bias the electrolyte potential in the seal region such that current flow through the anode seal is minimized. A biasing electrode can be an extension of the anode beyond the edge of the projected area of the cathode on the opposite side of the electrolyte plate. Alternatively, a separate biasing electrode or grounding ring can be placed on the electrolyte plate between the anode and the anode seal. An extended anode and a separate grounding ring can be used in combination if desired. The term biasing electrode as used herein is defined as any electrode material which is in electrical contact with the electrolyte plate, is located on an area of the electrolyte plate such that the area has no cathode material on the opposite side of thereof, and is maintained at a potential greater than about −40 mV relative to the anode side interconnect. This potential is maintained preferably by establishing electrical contact between the biasing electrode and the anode side interconnect. The projection of an area on the anode side of the plate covered by a biasing electrode onto the cathode side of the electrolyte plate will not contact or overlap cathode material. Typically the biasing electrode or electrodes are placed on the anode side of the electrolyte plate. If desired, a biasing electrode can be located on the cathode side of the electrolyte plate if such a biasing electrode (a) is not in electrical contact with the cathode, (b) is not in electrical contact with the cathode side interconnect, and (c) is in electrical contact with the anode side interconnect. At least a portion of such a cathode-side biasing electrode preferably is directly opposite the anode seal.

Another improvement is the radial offset of the anode and cathode seals such that the seals do not overlap on opposite sides of each electrolyte plate. This feature, defined herein as offset seals, requires a specific cell design geometry as described below. It has been found that a combination of offset seals and biasing electrodes is particularly effective in reducing or eliminating anode seal failure by controlling the potential across the anode seal at less than about 40 mV. This minimizes residual current flow through the seal.

The planar or flat plate design of the present invention utilizes alternating electrolyte plates and electrically-conductive interconnects which define individual electrochemical cells which operate in electrical series and isolate the feed and product gases as described above. The key component of each electrochemical cell is the electrolyte plate and associated electrodes which distribute the electrical potential and flow of electrons over the surface of the plate. The electrolyte plates should be as thin as possible while maintaining sufficient strength to operate at the required pressure differentials.

The electrolyte plates are planar and are stacked in the axial direction; the shape of the plates in the radial direction can be circular, square, rectangular, or any other planar geometrical shape. The preferred electrolyte plate of the present invention is generally square with rounded corners as shown in plan view in FIG. 1, which is the feed or cathode side of the plate. Electrode material 1, which is cathode material forming the cathode, is applied to the central region of the electrolyte plate such that continuous unelectroded regions 3 and 5 remain. Unelectroded region 5 surrounds opening 7 which extends through the plate. The term unelectroded region means any region of the electrolyte plate which has no electrode material applied thereon. The electrolyte material is a multicomponent ionic conducting metallic oxide comprising an oxide of at least two different metals or a mixture of at least two different metal oxides wherein the multicomponent metallic oxide demonstrates ionic conductivity at device operating temperatures, typically greater than about 500° C. Any solid oxygen ion-conducting electrolyte known in the art can be used; representative electrolytes include yttria stabilized zirconia, strontia-doped ceria, gadolinia-doped ceria, and bismuth vanadium oxide. The cathode material is formed from an oxidation-resistant metal, an alloy, or a multicomponent mixed conducting oxide. Particularly useful electrode material includes lanthanum strontium cobaltite (LSCO), $La_xSr_{1-x}CoO_{3-z}$, wherein x ranges from 0.2 to 1 and z is a number which renders the compound charge neutral. The LSCO can be used with an intermediate coating of lanthanum strontium cobaltite and silver or silver-palladium alloy which is applied to the electrode surface. The coating can be applied as a paste and sintered, or can be applied by screen printing or equivalent methods, by sputtering, or by other techniques well known in the art. The thickness of the cathode is about 0.1 to 100 microns. Representative dimensions of the electrolyte plate are 5 to 20 cm in width or diameter and 0.01 to 0.065 cm in thickness.

Figure 2:
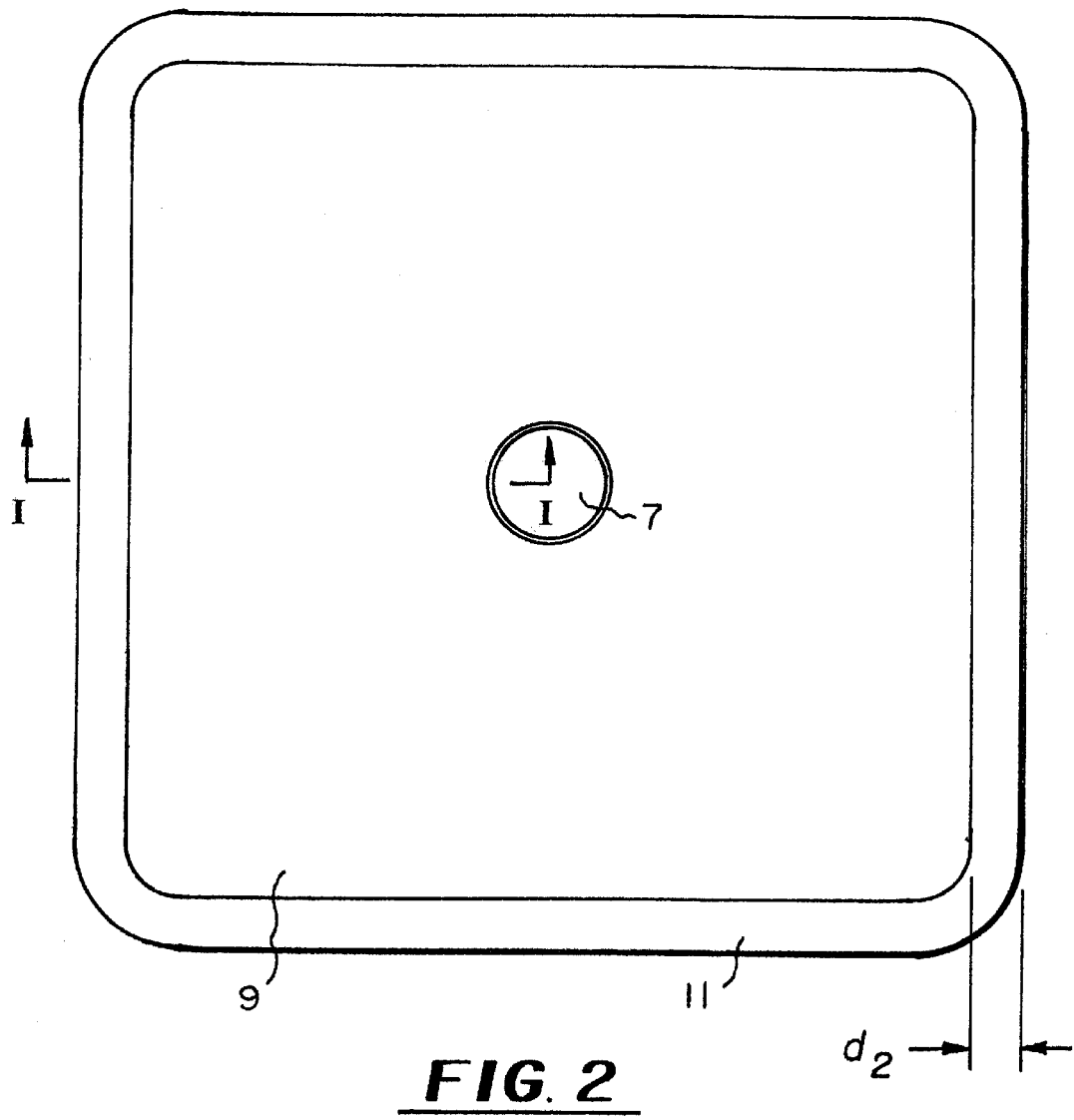
FIG. 2 is a plan view of the anode side of an electrolyte plate.

The anode side of the electrolyte plate is shown in plan view in FIG. 2. Electrode material 9 is applied around opening 7 and is surrounded by continuous unelectroded region 11 having a width of $d_2$. Width $d_2$ is less than width $d_1$ of the cathode side of FIG. 1, and the additional width or extension of electrode 9 on the anode side is defined as a biasing electrode which biases the potential across the anode seal (described below) and reduces current flow through the seal. Typically the difference between $d_1$ and $d_2$ is about 0.1 to 2.0 cm and defines an extended anode which serves as the biasing electrode. A further definition of the extended anode is a portion of electrode material which is contiguous with and in electrical contact with the anode, and is not congruent and not coextensive with the cathode on the opposite side of the electrolyte plate.

Figure 3:
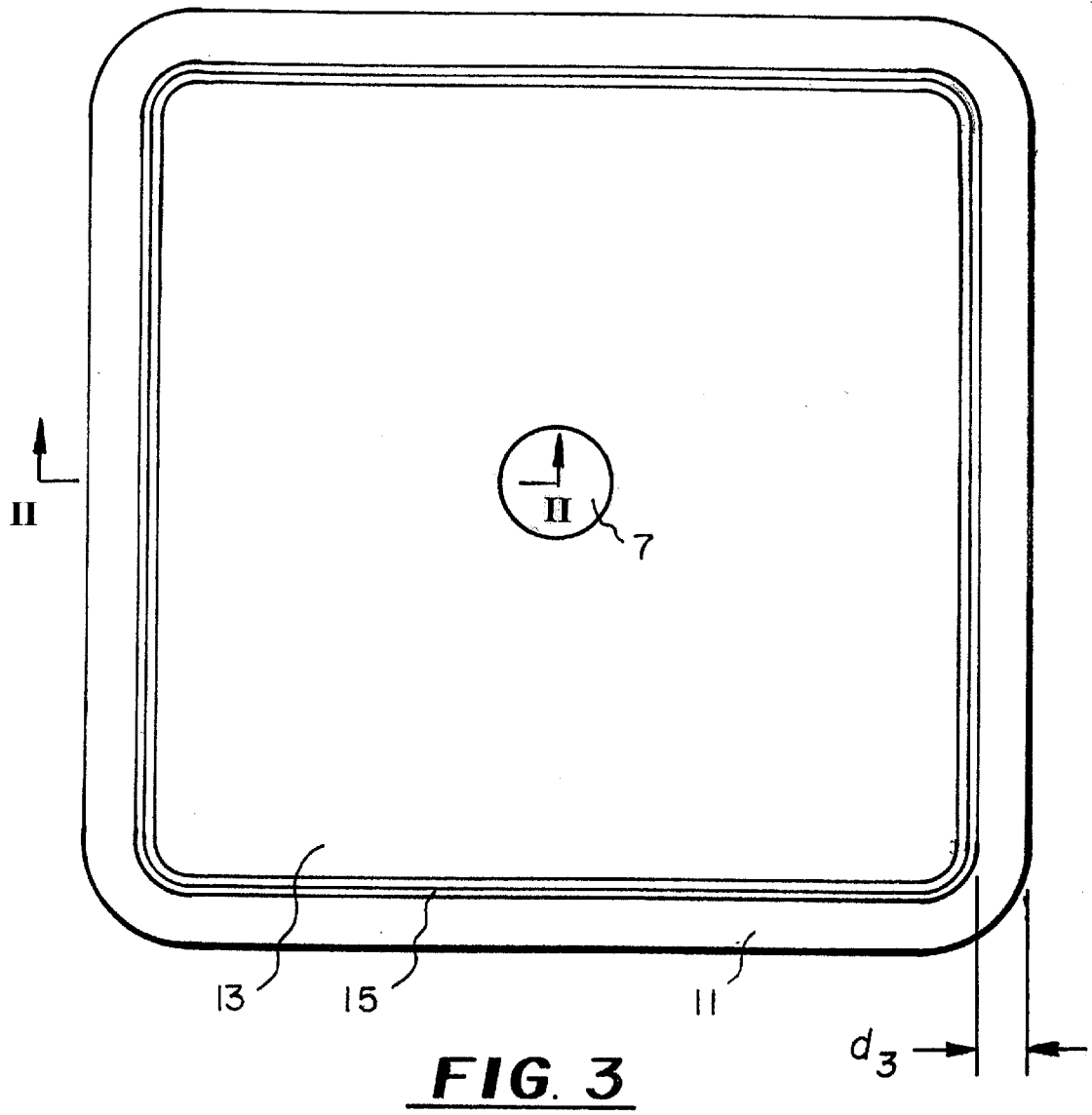
FIG. 3 is a plan view of the anode side of an alternative electrolyte plate.

An alternative anode side of the electrolyte plate is given in plan view in FIG. 3. Electrode material 13 is applied to the electrolyte plate and has the same shape and at least the same peripheral dimensions as electrode material 1 of FIG. 1. Separate biasing electrode 15 is applied between electrode 13 and the outer portion of unelectroded region 11. Biasing electrode 15 is also known as a grounding ring, which is defined as a biasing electrode not in direct contact with the anode. Optionally, electrode 13 is slightly larger than electrode 1 of FIG. 1. Opening 7 corresponds to opening 7 of FIG. 1. Width $d_3$ is similar to width $d_2$ of FIG. 2, and width $d_3$ is less than width $d_1$ of the cathode side of FIG. 1. The anode preferably uses electrically conducting material similar to that of the cathode described above and the biasing electrode described below, although different electrically conducting material can be used for any of these three electrode types.

The distribution of gas across the cathode side of the electrolyte plate, the withdrawal of oxygen from the anode side of the plate, and the transport of electrons from the anode side of one electrolyte plate to the cathode side of an adjacent electrolyte plate are promoted by planar interconnects having generally similar outside dimensions as the electrolyte plate. The interconnects are made of an oxidation resistant, gas-impermeable material having a thermal expansion coefficient comparable to that of the electrolyte, a high electronic conductivity, and low ionic conductivity. The material can be a multicomponent, electronically conducting multicomponent metallic oxide, a metal or metal alloy, or a mixture of the two. Suitable electronically conducting oxides include lanthanum strontium chromite, lanthanum calcium manganite and lanthanum calcium chromite. Lanthanum strontium manganite (LSM), $La_{0.5}Sr_{0.5}MnO_3$, is a preferred material for the interconnects.

Figure 4:
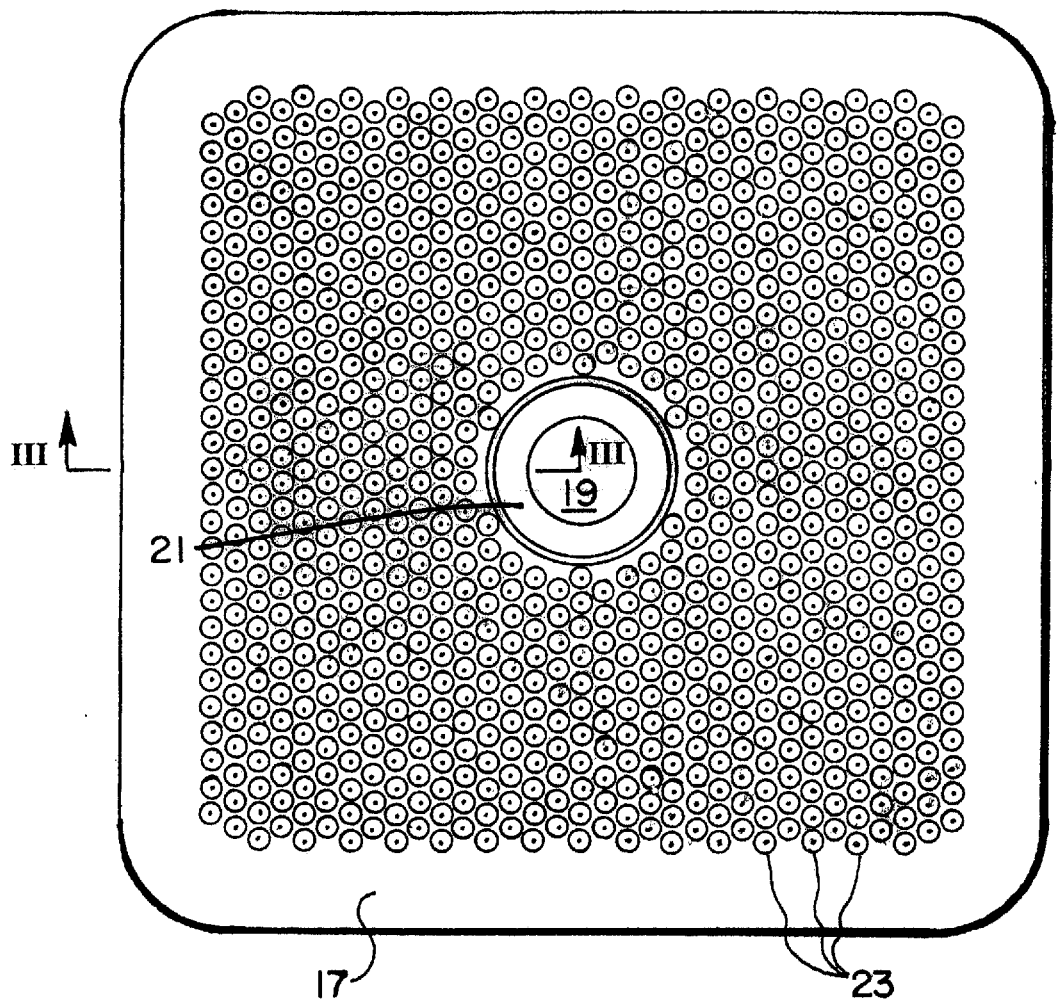
FIG. 4 is a plan view of the cathode side of an interconnect.

The cathode side of an interconnect is shown in plan view in FIG. 4, wherein the interconnect has a continuous generally flat peripheral region 17 and an opening 19 to the opposite side of the interconnect. The interconnect generally has the same shape and size as the electrolyte plates of FIGS. 1–3. A continuous generally flat region 21 surrounds opening 19. Opening 19 typically is the same or similar diameter as opening 7 in the electrolyte plates of FIGS. 1–3. A plurality of raised areas 23, characterized in this embodiment as frustoconical bosses or as spherical segments with flattened tops, which also may be described as pins, are disposed between flat regions 17 and 21. The continuous depressed or non-raised areas between the raised areas in conjunction with an adjacent electrolyte plate form a cavity in flow communication with flat peripheral region 17 as described below. Alternatives to raised areas 23 can be used, such as ribs, raised rectangular or triangular areas, and the like, which perform essentially the same function as raised areas 23. The tops of raised areas 23 and flat region 21 are generally coplanar, and this plane is above the plane formed by flat region 17.

Figure 5:
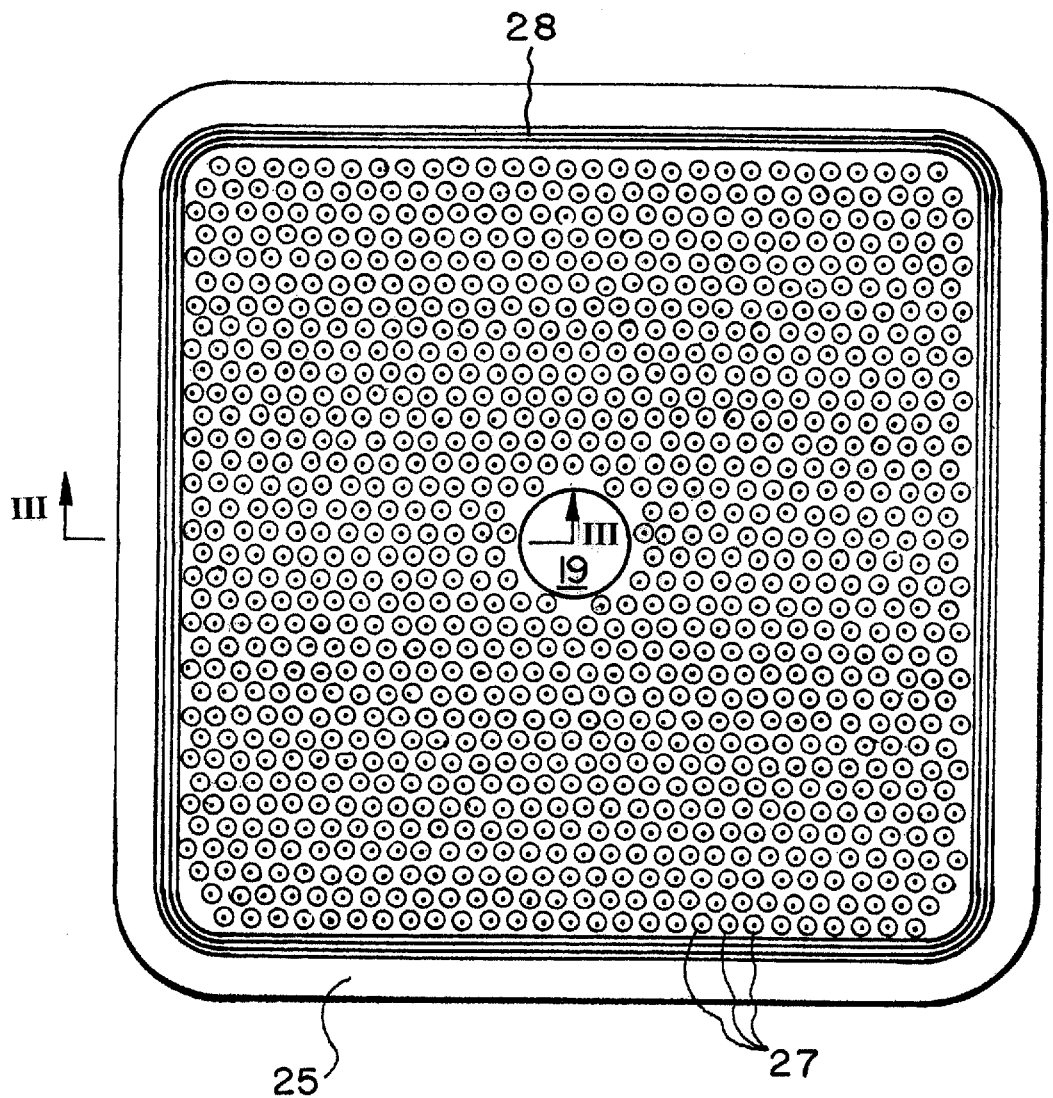
FIG. 5 is a plan view of the anode side of an interconnect.

The opposite or anode side of the interconnect is shown in plan view in FIG. 5. A continuous generally flat region 25 is disposed around the periphery of the interconnect, and a plurality of raised areas 27, characterized in this embodiment as frustoconical bosses or spherical segments with flattened tops, which also may be described as pins, are disposed between generally flat region 25 and opening 19. The continuous depressed or non-raised areas between the raised areas in conjunction with an adjacent electrolyte plate form a cavity or interconnected cavities in flow communication with opening 19 as described further below. Alternatives to raised areas 27 can be used, such as ribs, channels, and the like, which perform essentially the same function as raised areas 27. Continuous grounding rib 28 surrounds the raised areas and electrically contacts the biasing electrode as described below. The tops of raised areas 27, the top of grounding rib 28, and flat region 25 are generally coplanar.

A single electrolytic cell is formed by an electrolyte plate having an anode and a cathode, and the adjacent surfaces of two interconnects joined by the appropriate gas-tight anode and cathode seals and electrical connections. An exploded sectional view of a single electrolytic cell is given in FIG. 6A and is not necessarily to scale. Partial electrolyte plate 29, which corresponds to section I—I of FIGS. 1 and 2, has cathode portion 31 and anode portion 33 applied to the cathode and anode sides respectively. Anode portion 33 extends further in an outward radial direction than cathode portion 31, and this extended portion forms biasing electrode portion 34. Biasing electrode portion 34 is a part of the complete biasing electrode formed by the extension of anode 9 of FIG. 2 beyond cathode 1 of FIG. 1 in a radial outward direction. This extension is defined such that width $d_2$ of FIG. 2 is less than width $d_1$ of FIG. 1. Grounding rib 42 makes electrical contact with biasing electrode 34 when the stack is assembled. Preferably the ratio L/t is greater than about 10, where L is the width of biasing electrode portion 34 of FIG. 6A, i.e. the difference between $d_1$ and width $d_2$, and t is the thickness of electrolyte plate 29. The ratio L/t is selected such that the potential across anode seal 39, which is defined as the anode seal potential, is less than about 40 mV and preferably less than about 25 mV.

The anode seal potential is defined as the electrical potential difference measured between an electrical contact on the interconnect which is adjacent to the anode side of the electrolyte and a reference electrode located on the electrolyte in the vicinity of the anode seal. Further specifications defining the anode seal potential include the following. The reference electrode is located on the cathode side surface of the electrolyte plate directly opposite from the anode seal, where the area of electrical contact does not extend beyond the region defined by a projection of the anode seal onto the cathode side of the electrolyte plate. The electrical contact to the interconnect which is in direct contact with the anode seal is made on the cathode side surface directly opposite from the anode seal. This area of electrical contact does not extend beyond the region defined by a projection of the anode seal onto the cathode side of the interconnect. With reference to FIG. 6A, for example, the anode seal potential would be measured between location 46 on electrolyte plate 29 and location 44 on interconnect 37. The reference electrode is of the same type (composition, morphology, and method of making) as the anode. In addition, the oxygen absolute partial pressure of the gas in contact with the reference electrode differs from the oxygen absolute partial pressure of the gas in contact with the anode by no more than 5% of the oxygen absolute partial pressure of the gas in contact with the anode. The potential is measured under steady state non-transient conditions at the normal cell operating temperature, typically between 600° C. and 850° C., and with the normal operating current flowing through the electrolyte from anode to cathode, typically 50–1500 mA/cm$^2$.

The placement of the interconnect contact and reference electrode is such that the absolute value of the zero-current seal potential is minimized, and the minimized value preferably is less than about 0.1 mV. The zero-current seal potential is defined as the potential measured between the interconnect contact and the reference electrode under the same conditions as the measurement of the seal potential, but with zero steady-state current flowing through the cell. Such a zero-current potential is generated, for example, by temperature gradients in the electrolyte, and thus the zero-current potential is minimized by placing the reference electrode as close as possible to the interconnect contact. If the absolute value of the zero-current seal potential is not reduced to less than about 0.1 mV by judicious placement of the reference electrode, the seal potential is corrected by subtracting the zero-current seal potential from the seal potential, and redefining the seal potential as this difference.

Interconnect portions 35 and 37 of FIG. 6A correspond to section II—II of FIGS. 4 and 5. Anode seal 39 is disposed between continuous unelectroded region 41 (corresponding to continuous unelectroded region 11 of FIG. 2) and continuous generally flat region 43 (corresponding to continuous generally flat region 25 of FIG. 5). Cathode seal 45 is disposed between continuous unelectroded region 47 (corresponding to continuous unelectroded region 5 of FIG. 1) and continuous generally flat region 49 (corresponding to continuous generally flat region 21 of FIG. 4). A preferred material for seals 39 and 45 is a glass-ceramic derived from a lithium aluminosilicate (LAS) glass, which is a material known in the art for use in seals as described for example in an article by T. J. Headly and R. E. Loehman entitled "Crystallization of a Glass-Ceramic by Epitaxial Growth" in *Journal of the American Ceramic Society*, Vol.67, pp.620–625, 1984.

Anode seal 39 and cathode seal 45 form gas-tight seals between the respective areas of the electrolyte plate and the interconnect when the stack is assembled as described below. The gas tight seals maintain product gas purity and prevent product loss, and prevent or minimize the mixing of feed and product streams. The seals prevent or minimize gas mixing due to pressure differential and/or gas composition differential among the feed, permeate, and nonpermeate streams. The gas-tight seals also serve to bond the electrolyte plates and interconnects together in the stack as shown below. The seals can be cofired and bonded directly to the electrolyte plates and interconnects, or alternatively one or more additional cofired materials can be used.

Optionally an electrically insulating support is disposed between the cathode side of electrolyte plate 29 and the cathode side of interconnect 35, and a portion of this support is denoted as support 51. This support eliminates damaging stresses on electrolyte plate 29 when the gas pressure on the anode side of the electrolytic cell is greater than the gas pressure on the cathode side of the cell. Support 51 may or may not be gas tight, and is not applied continuously as explained in more detail below.

An exploded sectional view of an alternative single electrolytic cell is given in FIG. 6B. Components of this alternative electrolytic cell are identical to those of FIG. 6A except for the electrode material applied to the anode side of electrolyte plate 52. Anode portion 53 has a smaller extension in the outward radial direction than anode portion 33 of FIG. 6A, and separate biasing electrode portion 55 is applied to the anode side of electrolyte plate 52. Biasing electrode portion 55 is a part of biasing electrode 15 of FIG. 3. Grounding rib 56 makes electrical contact with biasing electrode portion 55 when the stack is assembled. This grounding rib typically is continuous and makes continuous contact with the biasing electrode, but optionally may be discontinuous, i.e. formed as a series of raised areas arranged in a circular pattern which are in electrical contact with the biasing electrode.

Figure 7A:
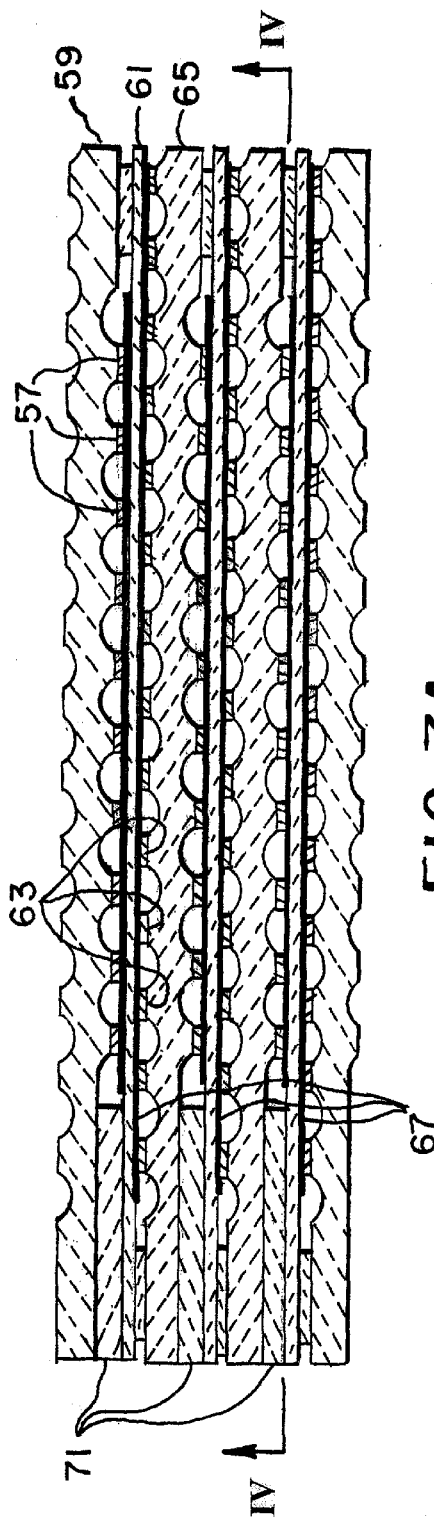
FIGS. 7A and 7B are assembled section views of multiple series electrolytic cells.

A plurality of the elements described in FIG. 6A are assembled by arranging alternating electrolyte plates and interconnects into a stack, and the stack is fired to yield a plurality of electrolytic cells in series, three of which are shown in FIG. 7A. In the process of assembling each cell, an electrically conducting material is applied to the surfaces of the raised areas on each interconnect as defined by elements 23 of FIG. 4 and 27 of FIG. 5. When the stack is fired, this conducting material bonds to the raised areas on the interconnects and to the electrodes on each electrolyte plate. The conducting material is shown in FIG. 7 as conformal layers 57 disposed between interconnect portion 59 and the cathode on electrolyte plate 61, and conformal layers 63 disposed between adjacent interconnect portion 65 and the anode on electrolyte plate 61. The conformal layers provide electrical connections between the electrodes and the adjacent interconnects, and also provide mechanical support for the electrolyte plate. The conducting material is preferably silver initially applied as an ink before firing.

Figure 7B:
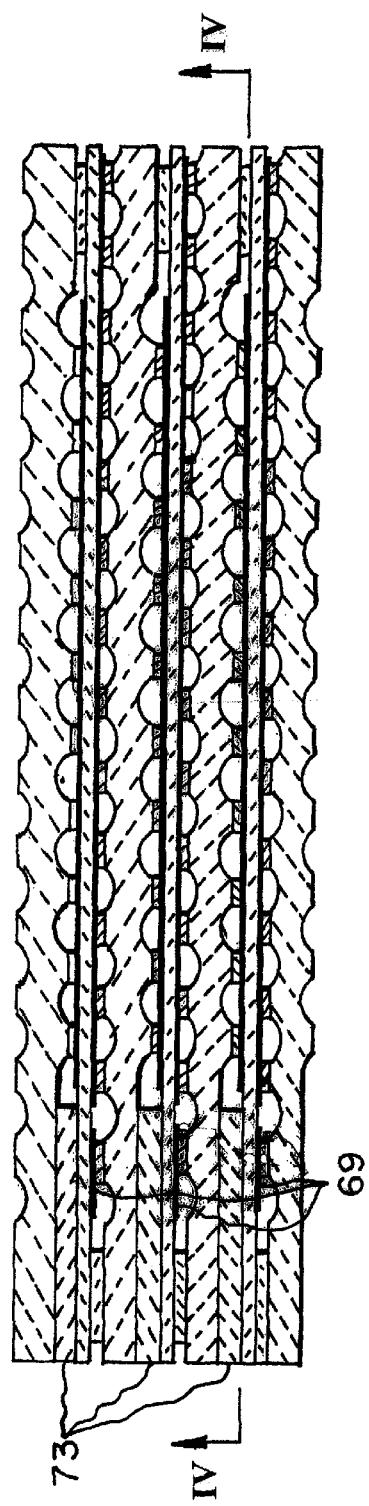

In the alternative embodiment described above, a plurality of the elements described in FIG. 6B are assembled into a stack and fired to yield a plurality of electrolytic cells in series, three of which are shown in FIG. 7B. The cells of FIG. 7B are identical to those of FIG. 7A except for different biasing electrodes. In FIG. 7A, biasing electrodes 67 are radial extensions of the anodes on the respective electrolyte plates wherein each anode extends radially beyond the edge of the cathode on the opposite side of the electrolyte plate. This was described earlier with respect to FIGS. 1 and 2 wherein the biasing electrode is the anode extension having a width equal to the difference between width $d_1$ and width $d_2$. In FIG. 7B, individual biasing electrode portions 69 are disposed between each electrolyte plate and the adjacent interconnects. The complete biasing electrode for this alternative is shown as element 15 in FIG. 3, wherein width $d_3$ is less than width $d_1$ in FIG. 1.

A preferred feature of this embodiment of the present invention is the use of biasing electrodes which reduce or eliminate anode seal failure by reducing the electrical potential across the anode seals to a value significantly below 40 mV. A second feature is that each anode seal is completely offset on the electrolyte plate relative to the corresponding cathode seal. The term offset seals is defined as the geometrical seal arrangement in which the projection of any anode seal area onto the cathode side of the electrolyte plate does not contact or overlap any cathode seal. This is illustrated in FIG. 6A wherein anode seal portion 39 is disposed adjacent to the outer periphery of the electrolyte plate whereas cathode seal portion 45 is disposed adjacent to the central opening in the plate. The combination of biasing electrodes and offset seals as utilized in the present invention is particularly effective in eliminating anode seal failure.

Operation of the planar electrolytic cells as described above may require that the pressure of the oxygen product is higher than the pressure of the oxygen-containing feed gas, such that the cells operate in an oxygen pumping mode. This operation may place a significant mechanical stress on the outer region of the electrolyte plate. As earlier described, this problem is alleviated by the use of electrically insulating support 51 disposed between the cathode side of electrolyte plate 29 and interconnect 35 (FIG. 6A). This electrically insulating support reduces potentially damaging stresses on electrolyte plate 29 when the gas pressure on the anode side of the electrolytic cell is greater than the gas pressure on the cathode side of the cell. Multiple supports are shown in FIG. 7A as supports 71 and FIG. 7B as supports 73.

The electrically insulating support material should have a coefficient of thermal expansion which is substantially equivalent to the coefficient of thermal expansion of the adjacent electrolyte material or that of the adjacent interconnect material. Substantially equivalent means that the coefficients of thermal expansion of the insulating support and an adjacent material over the temperature range of about 20° C. to about 750° C. differ by less than about 2 micrometer/(meter$\Omega$°C.), preferably by less than about 1 micrometer/(meter$\Omega$°C.), and most preferably by less than about 0.5 micrometer/(meter$\Omega$°C.). Insulating support material having lower values of Young's modulus can tolerate larger differences in the coefficient of thermal expansion compared with the electrolyte and interconnect materials, while insulating support materials with higher Young's modulus values can tolerate smaller differences in the coefficient of thermal expansion. The insulating support is prepared using one or more electrically insulating ceramics as described below. An electrically insulating ceramic is defined herein as any electrically nonconductive ceramic which does not permit the passage of electrical current when placed in an electric field (see *Modern Ceramic Engineering*, D. W. Richerson, 2nd Edition, Marcel Deckker, Inc, New York, p. 228). Mixtures of such ceramics are selected to have high electrical resistivity and to have coefficients of thermal expansion similar to those of the electrolyte and interconnect materials. Representative ceramics for use in the insulating support include but are not limited to the oxides of Mg, Al, Si, Yb, Ca, Be, Sr, Nd, Sm, Er, Eu, Sc, La, Gd, Dy, and Tm.

The insulating support can be fabricated by several different methods. In the first of these methods, the insulating support is made by preparing a mixture of inorganic oxide glass or glass-ceramic combined with one or more electrically insulating ceramics in an organic vehicle or carrier to form an ink, applying the ink to an interconnect or the electrolyte plate, and firing at above about 500° C. The firing temperature preferably approaches or reaches the melting temperature of the glass, which typically is in the temperature range of about 800° to about 1000° C. The preferred coefficient of thermal expansion of the support material after firing is between about 9 and about 15 micrometer/(meter$\Omega$°C.).

A typical ink composition is 70 wt % solids and 30 wt % liquid organic vehicle or carrier, although other compositions can be used as required. A preferred composition range of the solids portion of the mixture before firing (excluding the organic vehicle or carrier) contains about 0.3 to about 27 wt % of a lithium aluminosilicate glass with the remainder being the insulating ceramics magnesia (MgO) and alumina ($Al_2O_3$). The weight ratio of magnesia to alumina in the mixture before firing is selected to be between about 0.2 and about 8 in order to yield the preferred coefficient of thermal expansion of the insulating support material. In addition, the amount of glass is selected such that the final assembled insulating support after firing is electrically insulating.

In another method, a mixture of electrically insulating ceramics is formed into a desired shape and sintered to form an electrically insulating support. This sintered electrically insulating support is bonded to the electrolyte and interconnect by placing inorganic oxide glass or glass-ceramic between the insulating support and the electrolyte, placing inorganic oxide glass or glass-ceramic between the insulating support and the interconnect, and firing at a temperature sufficient to bond the insulating support to both the electrolyte and the interconnect. Preferably the inorganic oxide glass or glass-ceramic is a lithium aluminosilicate glass. Alternatively, the sintered electrically insulating support can be bonded to the electrolyte by cofiring at temperatures sufficient to bond the insulating support directly to the electrolyte without the use of inorganic nonmetallic glass.

Figure 8:
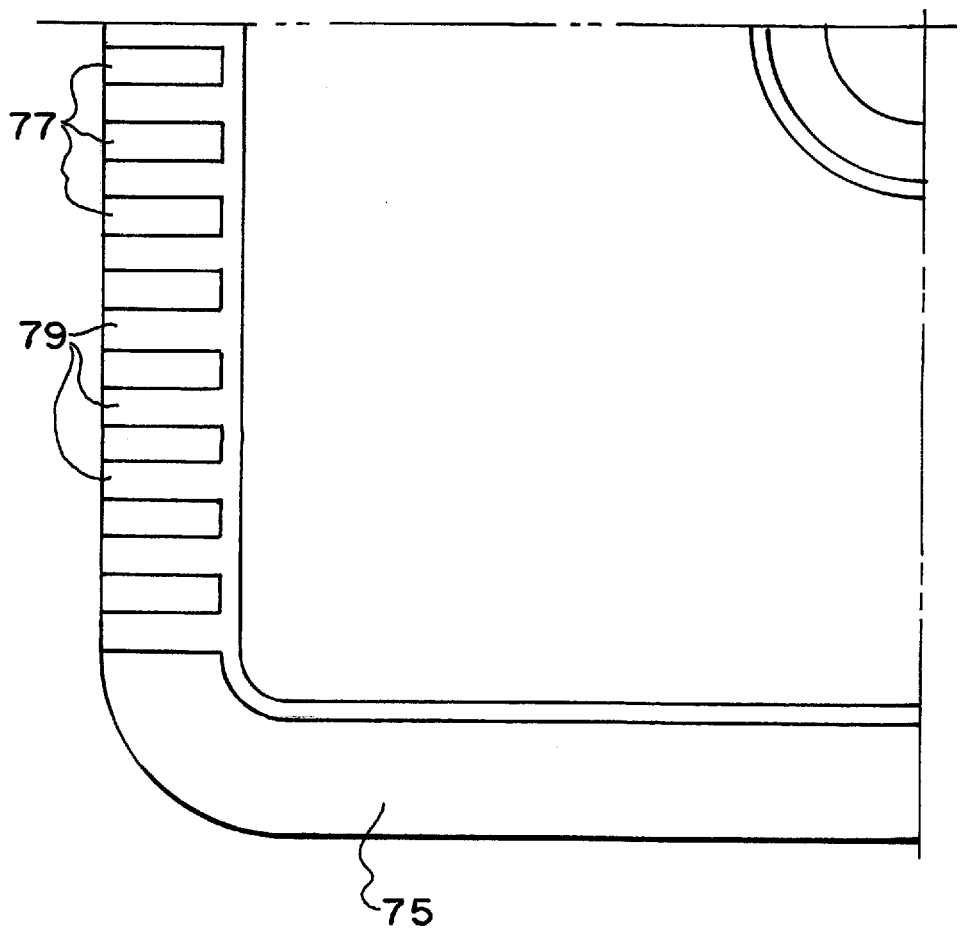
FIG. 8 is a quarter section through the insulating support, electrode, and cathode seal of an assembled stack.
Figure 9:
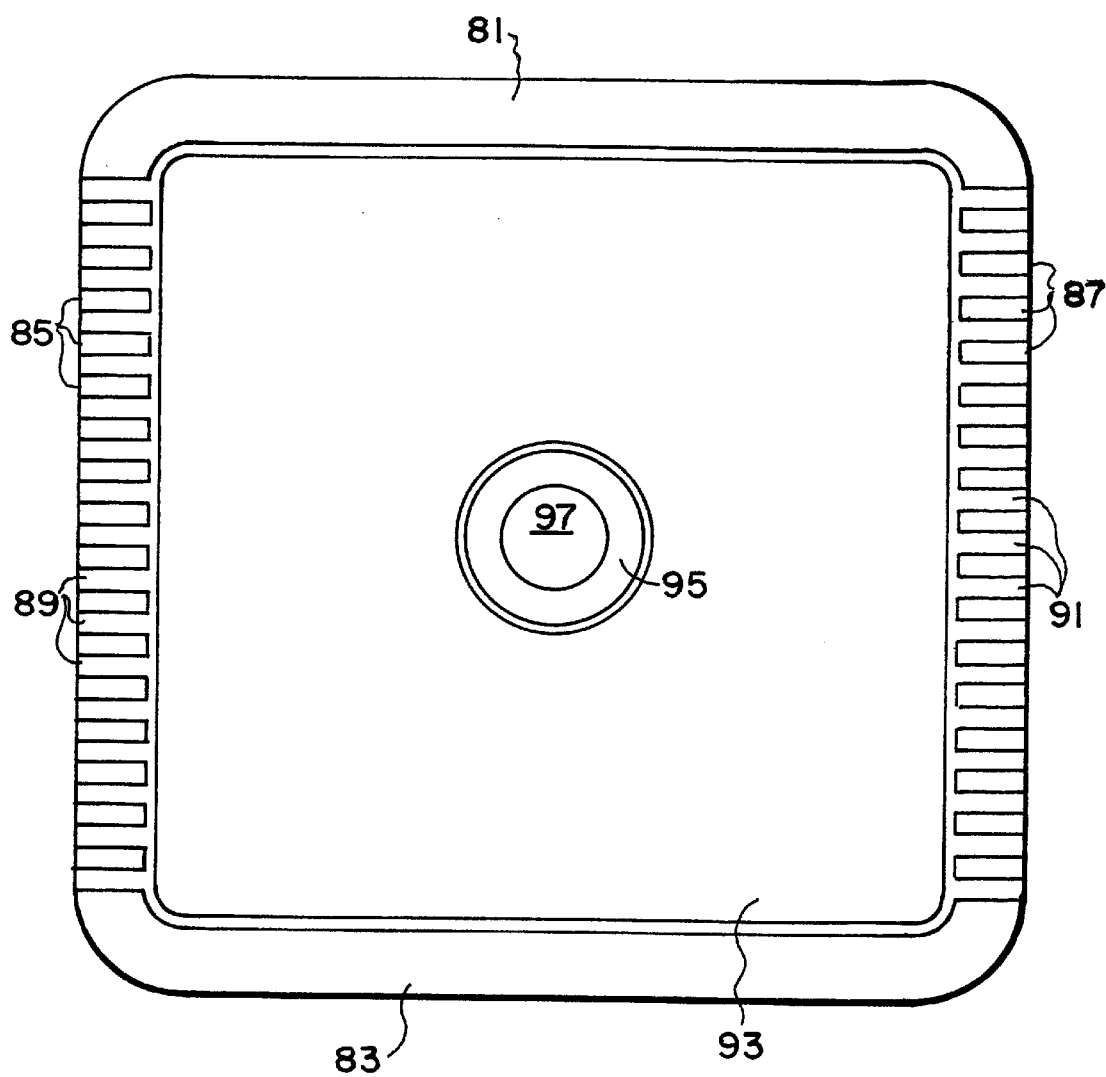
FIG. 9 is a complete section through the insulating support, electrode, and cathode seal of an assembled stack.

The insulating support is further described in FIG. 8, which corresponds to section IV—IV of FIGS. 7A and 7B. The insulating support is applied discontinuously such that one portion 75 forms a continuous support and additional portions 77 form individual supports separated by open spaces 79. This is illustrated more clearly in FIG. 9, which is an expansion of section to IV—IV a corresponding full section of the entire stack at the same axial location. Insulating support portions 81 and 83 are continuous on opposite sides of the stack, while support portions 85 and 87 are discontinuous on opposite sides of the stack. Openings 89 and 91 allow cross flow of feed gas through the stack, as described more fully later, such that oxygen-containing feed gas flows through openings 89 while oxygen-depleted gas exits the stack through openings 91. The section of FIG. 9 also shows cathode 93 and cathode seal 95 which surrounds central opening 97.

Figure 10:
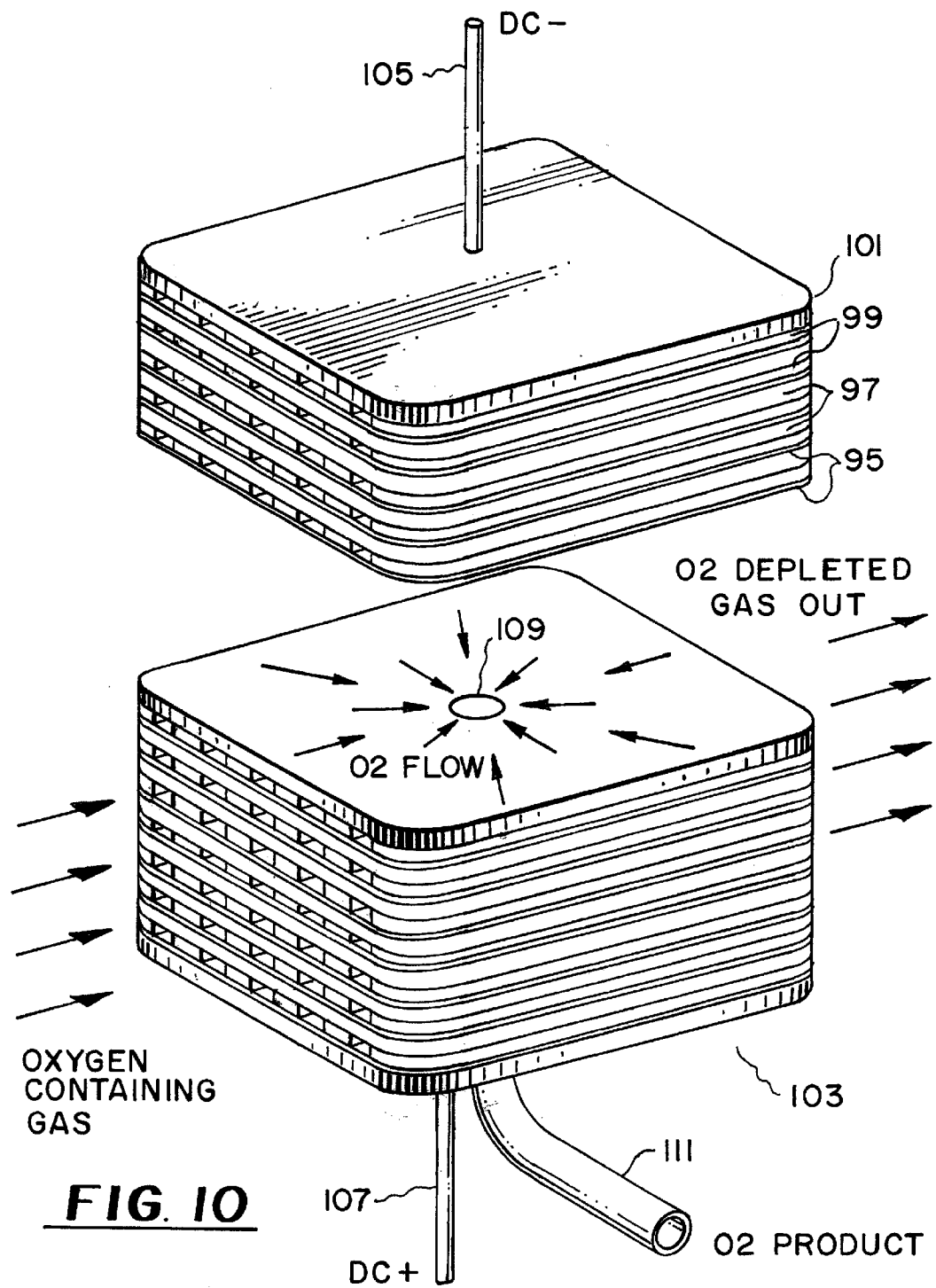
FIG. 10 is a schematic isometric view of a complete electrolyte stack.

The overall assembly and operation of the electrolytic cell stack is illustrated by the schematic isometric view of FIG. 10, which is not to scale. The cell stack is formed by a series of alternating electrolyte plates 95 with appropriate anodes and cathodes (not shown), interconnects 97 and insulating support material 99, with negative end plate 101 and positive end plate 103. Positive and negative electrical connections provide direct current to the stack, which operates at about 50 to 700 mV per cell.

Oxygen-containing feed gas flows into one side of the stack as shown, flows through the cathode sides of the cells in a crossflow mode, and the oxygen-depleted gas exits the opposite side of the stack. The insulating supports on the opposite sides of the stack direct gas in a crossflow mode as earlier described. A section through the stack shows the radial flow of oxygen product gas across the anode side of an interconnect towards the central opening 109. The central openings through the electrolyte plates and interconnects, in conjunction with the cathode seals earlier described, form a central conduit in gas flow communication with the anode side of each cell. The central conduit connects with oxygen withdrawal conduit 111 which in turn is connected with a gas-tight seal (not shown) to bottom or positive end plate 103. Alternatively, an oxygen withdrawal conduit could be connected at negative end plate 101 (not shown). If desired, oxygen product can be withdrawn from both ends of the stack (not shown).

The stack can be operated in at least two alternative modes. In the first mode, the feed gas is air and a high purity oxygen product comprising at least 99.5 vol % oxygen is withdrawn through conduit 111. The feed air typically is introduced at a pressure slightly above atmospheric which is sufficient to sustain proper air flow through the stack. Typically the oxygen is produced continuously at a pressure of at least 5 kPa above the feed pressure, which is possible by application of the offset seals, biasing electrodes, and insulating supports earlier described. The stack is operated at a temperature above 500° C.

In a second operating mode, the feed gas is an inert gas such as nitrogen or argon which contains a low concentration of oxygen as an impurity. The electrolyte cell stack is operated to remove a major portion of the oxygen such that the oxygen depleted gas flowing from the cathode sides of the cells contains typically less than about 100 ppbv to less than about 10 vol % oxygen. The flow of oxygen from conduit 111, which will be of high purity but low volume, may be a useful product as well. In this embodiment, it may be desirable to operate the stack such that the feed gas and oxygen-depleted product pressures are above the oxygen product pressure. In such a case, the use of the insulating support material in the stack would be optional because the electrolyte plates would receive sufficient mechanical support from the conformal layers and anode seals earlier described.

At higher operating pressures, the stack assembly may require end constraints to maintain stack integrity. These end constraints operate on end plates 101 and 103 to provide axial compressive forces which compensate for the tendency of the stack to separate under such pressures.

While the present invention preferably is utilized for the separation of air to recover high purity oxygen and the purification of inert gas to remove residual oxygen, the invention can be applied to any oxygen-containing gas mixture for any desired purpose or end product.

The electrolyte cell stack of the present invention can be fabricated by methods known in the art of ion conducting ceramics, for example as described in European Patent Application Publication No. 0 682 379 A1 earlier cited. The invention can be practiced with any materials known in the art and generally used in ion conductor stacks for electrolyte plates, electrodes, interconnects, and seals.

Other stack geometries can be envisioned which would be embodiments of the present invention in which biasing electrodes and offset seals are utilized to control the potential across the anode seal below about 40 mV and preferably below about 25 mV. Biasing electrodes and offset seals can be applied with alternative stack configurations for introducing feed gas into the stack, for withdrawing oxygen-depleted gas from the cathode sides of the cells, and/or withdrawing oxygen from the anode sides of the cells.

In an alternative embodiment of the invention, electrically insulating material is incorporated into the cathode seal, and biasing electrodes are utilized as described above. The insulating material preferably is prepared by sintering a mixture of magnesium oxide (MgO) and aluminum oxide ($Al_2O_3$), and the insulating material is sealed to the cathode sides of the electrolyte plate and the interconnect with a glass-ceramic sealant, for example such as that derived from a lithium aluminosilicate (LAS) glass. In preparing the insulating material, aluminum oxide is used to lower the coefficient of thermal expansion of the magnesium oxide such that the coefficient of thermal expansion of the insulating material matches that of the electrolyte and interconnect materials. Some magnesium oxide spinel ($MgAl_2O_4$) may form in situ during sintering of the material. Alternatively, aluminum oxide and magnesium oxide can be fired at temperatures sufficiently high to form a MgO/$MgAl_2O_4$ ceramic. Alternatively, the insulating material can be cofired with the electrolyte at about 1550° C. without the use of the glass sealant.

In this alternative embodiment which utilizes insulating material in the cathode seal, complete offset of the anode and cathode seals is not required, which allows additional flexibility in stack design. This embodiment can be applied to any stack design having directly opposed or partially opposed anode and cathode seals as long as the stack geometry allows the inclusion of a biasing electrode. For example, the embodiment could be applied to the planar stack design described in European Patent Application Publication No. 0 682 379 A1 cited above. The combination of an insulating cathode seal and a biasing electrode will allow control of the potential across the anode seal below about 40 mV and preferably below 25 mV.

EXAMPLE 1

The insulating support between the cathode sides of the electrolyte plate and the interconnect as described above can be formed by applying prior to stack assembly and firing an ink which contains precursor materials in a liquid vehicle or carrier. An ink for the formation of insulating support material upon firing was prepared as follows. 59.3 g of alumina (Alcoa, SG 16), 255.7 g of magnesia (Martin-Marietta, MC10-325), and 35.0 g of a lithium aluminosilicate glass (Specialty Glass, SP1484-A) were combined and mixed in a stainless steel bowl. 72.0 g of α-Terpineol (Kodak) and 78.0 g of V-006 (Heraeus, Cermalloy Division) were mixed in a second stainless steel bowl. One third of the solid mixture was slowly added to the liquids and mixed together with a rubber spatula until all the powder was wetted. This step was repeated with the remaining powder until all the powder was incorporated. The mixture was then processed four times through a three-roll-mill to produce the final ink, using the mill spacing recorded below:

|  | Entry Roll Spacing | Exit Roll Spacing |
| --- | --- | --- |
| First Pass | 0.032 cm | 0.019 cm |
| Second Pass | 0.019 cm | 0.006 cm |
| Third Pass | 0.006 cm | <0.005 cm |
| Fourth (Final) Pass | 0.006 cm | <0.005 cm |

EXAMPLE 2

A two-cell stack was constructed and operated to demonstrate the use of a stack design incorporating offset seals and biasing electrodes. A 2-cell 7.6 cm diameter round stack was constructed from two 10 mole % strontia-doped ceria (SCO) electrolyte plates and three $La_{0.5}Sr_{0.5}MnO_3$ (LSM) interconnect plates arranged in alternating layers. The electrolyte plates were 0.025 cm thick. Both the interconnects and electrolyte plates had a central hole, and the holes aligned in the stack to form a central axial conduit which collected oxygen generated electrochemically at each anode. Each interconnect had a circumferential sealing surface 0.38 cm wide near the outer periphery of the anode side for a glass-ceramic seal. The cathode side interconnect sealing surface was located around the central hole and was also 0.38 cm wide. The electrolyte plates had nonelectroded sealing surfaces on the cathode and anode sides which aligned with the corresponding interconnect sealing surfaces. The electrolyte and interconnect stack components were bonded together at these sealing surfaces with a lithium aluminosilicate (LAS) glass-ceramic to form gas-tight seals.

Anode-side and cathode-side electrodes of lanthanum strontium cobaltite (LSCO), $La_xSr_{1-x}CoO_{3-z}$, wherein x ranges from 0.2 to 1.0 and z is a number which renders the compound charge neutral, were applied to the electrolyte plates. An overcoating of LSCO and silver-palladium alloy was applied to the electrodes. The electrodes were applied so that the anode was oversized relative to the cathode by 0.14 cm at the outer edge, such that the portion of the anode extending beyond the outer circumference of the cathode formed a biasing electrode as earlier described. In addition, a separate outer biasing electrode or grounding ring of the same electrode composition was applied outside the extended anode. The grounding ring biasing electrode was 0.18 cm wide, and was separated from the anode by a 0.13 cm wide gap of bare SCO electrolyte. The cathode area was 21 $cm^2$ per plate. Thus the anode and biasing electrode configuration was similar to those described in FIGS. 3, 6B, and 7B. The insulating support of FIG. 6B was not used.

The electrodes were connected to 0.05 cm high (0.13 cm wide) ribs on the interconnect, separated by channels 0.13 cm wide. Silver was applied as a conductive layer between the top surface of the interconnect ribs and the electrode. The top surface of the ribs formed a common plane with the sealing surface for the glass-ceramic seal on both sides of the interconnect. The channels allowed oxygen to flow radially to the central collection port on the anode, and air to flow across the cathode in a crossflow mode.

One of the terminal interconnect plates or end plates was attached to a section of 0.48 cm O.D. 446 stainless steel tubing for oxygen withdrawal. The central hole in the other terminal interconnect plate or end plate was closed with a 2 inch square LSM plate attached with LAS. Air was supplied to the cathode-side of the stack at approximately 2 standard liters per minute. A voltage of approximately 1 V was applied between the two terminal LSM interconnect plates at 750° C., and the stack electrical current and resulting flow rate of electrochemically generated oxygen were measured. A digital mass flow meter attached to the SS446 tubing was used to measure the flow. The anode-side pressure was controlled by a hand valve attached to the SS446 tubing and monitored by a Bourdon-tube pressure gauge. Seal integrity was determined by calculating the flow efficiency as follows:

$$\text{flow efficiency} = \frac{100 \times \text{measured } O_2 \text{ flow rate } (std\ cc/\min)}{\text{theoretical } O_2 \text{ flow rate } (100\% \text{ efficient})}$$

$$= \frac{100 \times \text{measured } O_2 \text{ flow rate } (std\ cc/\min)}{\text{measured current (amps)} \times 3.75 \times N}$$

where N is the number of cells in the stack and 3.75 is a conversion factor having units of (std cc/min)/(amps). The flow in std cc/min is defined at 21° C. The theoretical flow rate is realized when all current is fully utilized to produce collected oxygen product, i.e., when one molecule of oxygen is produced for every four electrons flowing through each cell, and all oxygen is collected in the absence of seal leaks.

The stack was held at a permanent differential pressure of 2 kPa (anode side pressure higher) for the first 1025 hours of operation, and subsequently at a differential pressure of 10 kPa (anode side pressure higher). Stack operation was monitored continuously for 5000 hours and the measured oxygen flow was essentially 100% of theoretical during the entire period. This indicates seal integrity and absence of detectable leaks.

EXAMPLE 3

Figure 11:
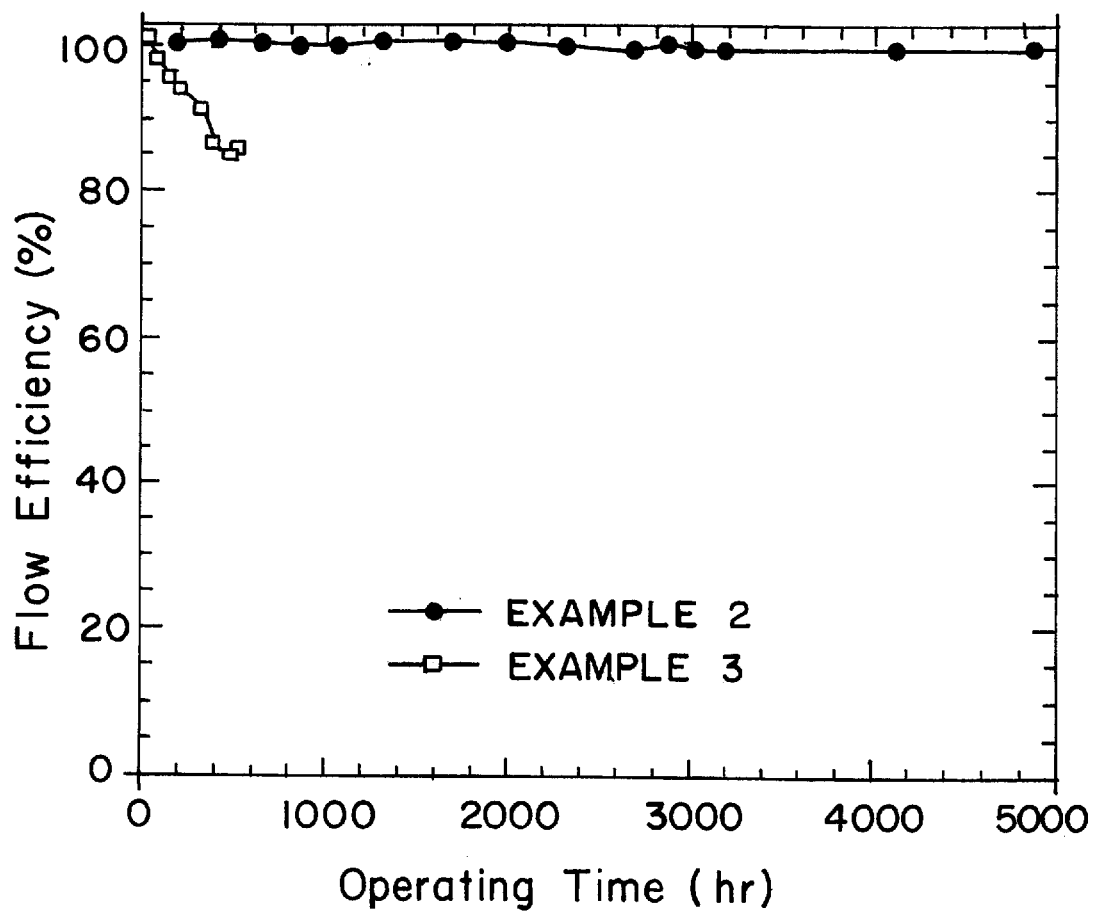
FIG. 11 is a plot of flow efficiency vs. operating time for Examples 2 and 3 in the Specification.

A 2-cell 7.6 cm diameter round stack was constructed according to the procedure described in Example 2, except that the electrodes were coextensive at their outer edges on the electrolyte plates, i.e., the outer diameter of both electrodes was equivalent and there was no biasing electrode on the anode side. The cathode area was 31 cm² per plate. The stack was operated at 750° C. in a manner similar to Example 2, except that a voltage of 1 V was applied to the stack at a permanent differential pressure of 6.9 kPa (anode side pressure higher). Flow efficiency was monitored online for 480 hours in the same manner as described in Example 2. After operating the stack for 480 hours, the flow efficiency was measured over the differential pressure range 0 to 6.9 kPa (anode side pressure higher). Stack operation was terminated after 505 hours due to a significant loss in flow efficiency. The loss in flow efficiency was found to be the result of debonding of the interface between the LAS seal and the electrolyte on the anode-side of the electrolyte plate. The performance of the stack as a function of online operating time is shown in FIG. 11 for comparison with the performance of the stack of Example 2. This comparison demonstrates that biasing electrodes are required in stacks which utilize offset seals to provide a robust gas-tight anode seal.

EXAMPLE 4

Figure 12:
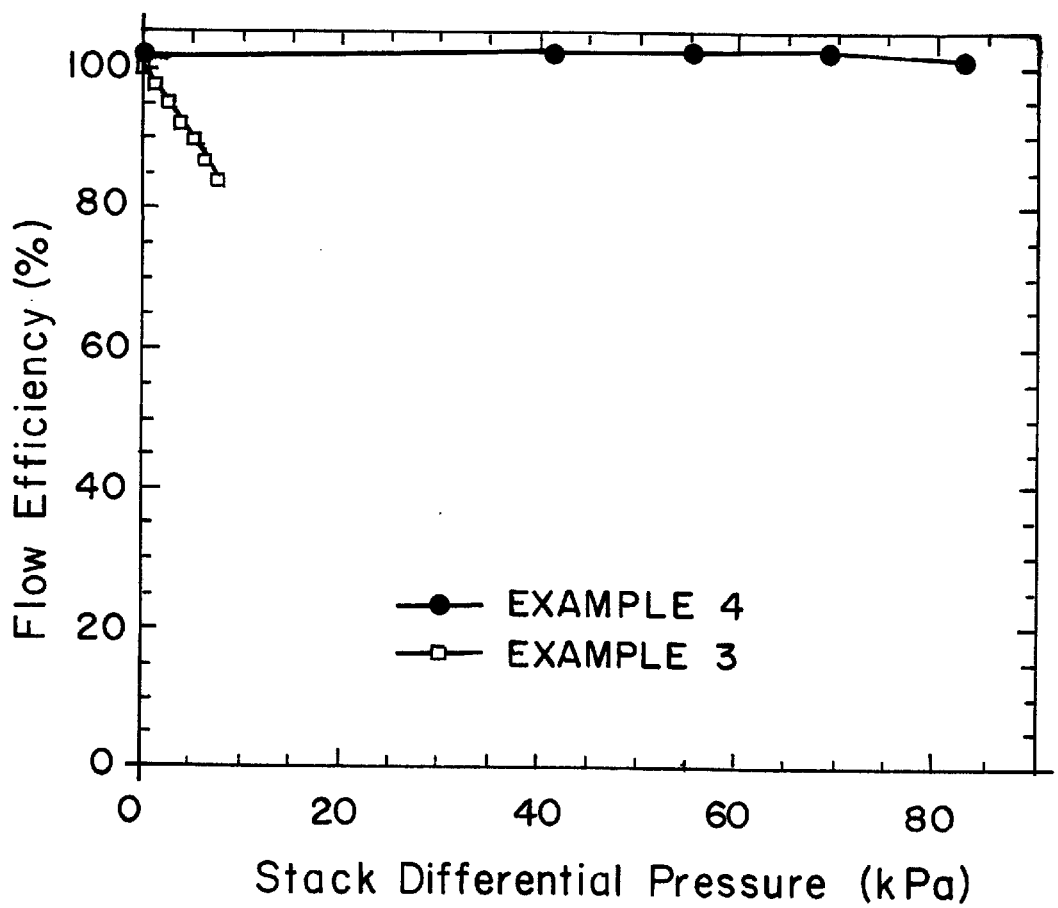
FIG. 12 is a plot of flow efficiency vs. stack differential pressure for Examples 3 and 4 in the Specification.

A 5-cell 7.6 cm diameter round stack was constructed according to the procedure described in Example #2, except that five electrolyte plates and six interconnects were used. The anode was oversized relative to the cathode by 0.11 cm at the outer edge. The anode side outer grounding ring electrode was 0.19 cm wide, and was separated from the anode by a 0.10 cm wide gap of bare SCO electrolyte. The cathode area was 24 cm² per plate. An insulating support was used similar to that described with reference to FIGS. 6B, 7B, 8, and 9 using material prepared according to Example 1. The insulating support material was bonded to the non-electroded periphery of the cathode side of the electrolyte and the flat area adjacent to periphery of the interconnect. Gaps were periodically left in the insulating support layer to allow air flow across the cathodes and oxygen-depleted air withdrawal from the cathodes similar to the flow configuration shown in FIG. 10. The stack was operated at 750° C. in a manner similar to Example 2, except at a voltage of 2V and a permanent differential pressure of approximately 35 kPa (anode side pressure higher). After operating the stack for 1680 hours, the flow efficiency was measured over the differential pressure range 0 to 83 kPa (anode-side pressure higher) and was essentially 100% as shown in FIG. 12. This indicates excellent seal integrity which was maintained by the use of biasing electrodes, and complete integrity of the electrolyte plate which was maintained by the use of the insulating support layer. FIG. 12 also shows the operating data over a differential pressure range of 0–6.9 kPa for the stack of Example 3, which had no biasing electrodes. It is seen that flow efficiency for this stack design decreased rapidly as the differential pressure was increased.

EXAMPLE 5

Figure 13:
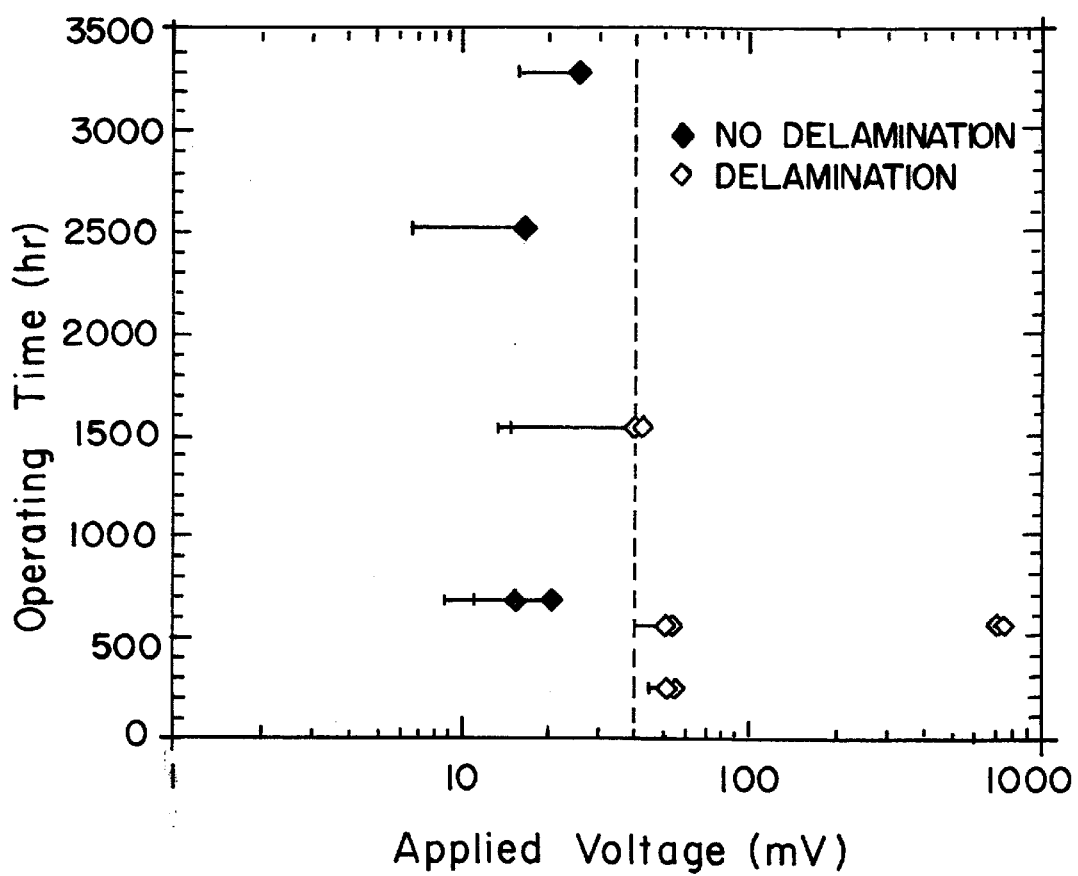
FIG. 13 is a plot of operating time vs. applied voltage for Example 5 in the Specification.

In order to determine the maximum voltage above which debonding occurs at the interface between the glass-ceramic LAS anode seal and the electrolyte on the anode side of the electrolyte plate, several pellet test samples were prepared and operated at various voltages. Each test sample comprised a 2.5 cm diameter pellet of the LSM interconnect material, which was bonded with LAS directly to a 2.6 cm diameter 0.038 cm thick electrolyte disc made of SCO. The electrolyte had a 4 cm² LSCO electrode with an overcoating of LSCO and silver-palladium alloy applied to the air side. A porous silver layer was then applied over the electrode to act as a current collector. A voltage was applied across each LSM pellet and current collector at 750° C., such that the electrode was negatively charged, thereby simulating the configuration of the LAS and SCO in the anode seal of a stack. The voltage was measured as a function of time. After continuous operating periods of 300 to 3300 hours, pellet samples were removed from test and the LAS to SCO electrolyte bond tested for delamination with a razor blade. The relationship between the operating time, applied voltage, and bond integrity is plotted in FIG. 13. The range of voltages applied to each pellet is shown, and the data points indicate the maximum applied voltage in each test. The results clearly demonstrate that the potential or voltage across the anode seal and in particular across the LAS:SCO stack bonds must be maintained below about 40 mV, and preferably below about 25 mV, in order to avoid delamination at the LAS:SCO interface and maintain the integrity of the anode seal.

EXAMPLE 6

The effects of biasing electrode width and electrolyte thickness on the voltage measured between the anode and the reference electrode (which approximates the anode seal potential in a stack) were examined using a series of test samples comprising a rectangular 2.5 cm by 5.0 cm SCO electrolyte plate with a thickness of 0.015 or 0.038 cm. LSCO electrodes with an overcoating of LSCO and silver-palladium alloy were applied to both sides of the electrolyte plate. In each case the anode dimensions were 1.9 by 1.9 cm, and the cathode was undersized relative to the anode by varying amounts. This resulted in varying widths of a biasing electrode formed because the anode is larger than the cathode. A LSCO reference electrode was attached to the anode side, at the location of the anode glass-ceramic seal in a fully assembled stack, approximately 0.065 cm from the edge of the anode. Alternatively, a block of LSM was attached with LAS sealant at the location of the anode/glass-ceramic seal in the fully assembled stack, while the reference electrode was attached on the cathode side opposite the LSM block. In several cases, an additional biasing electrode or grounding ring was applied to the anode side (similar to FIG. 3) between the anode and the reference electrode. The width of the grounding ring and the gap between the grounding ring and the anode were included in the reported measurements of the width of the entire biasing electrode; this width is equal to the radial distance between the outer edge of the grounding ring and the outer edge of the cathode. A porous silver layer was then applied over the electrodes and reference electrode to act as a current collector.

Figure 14:
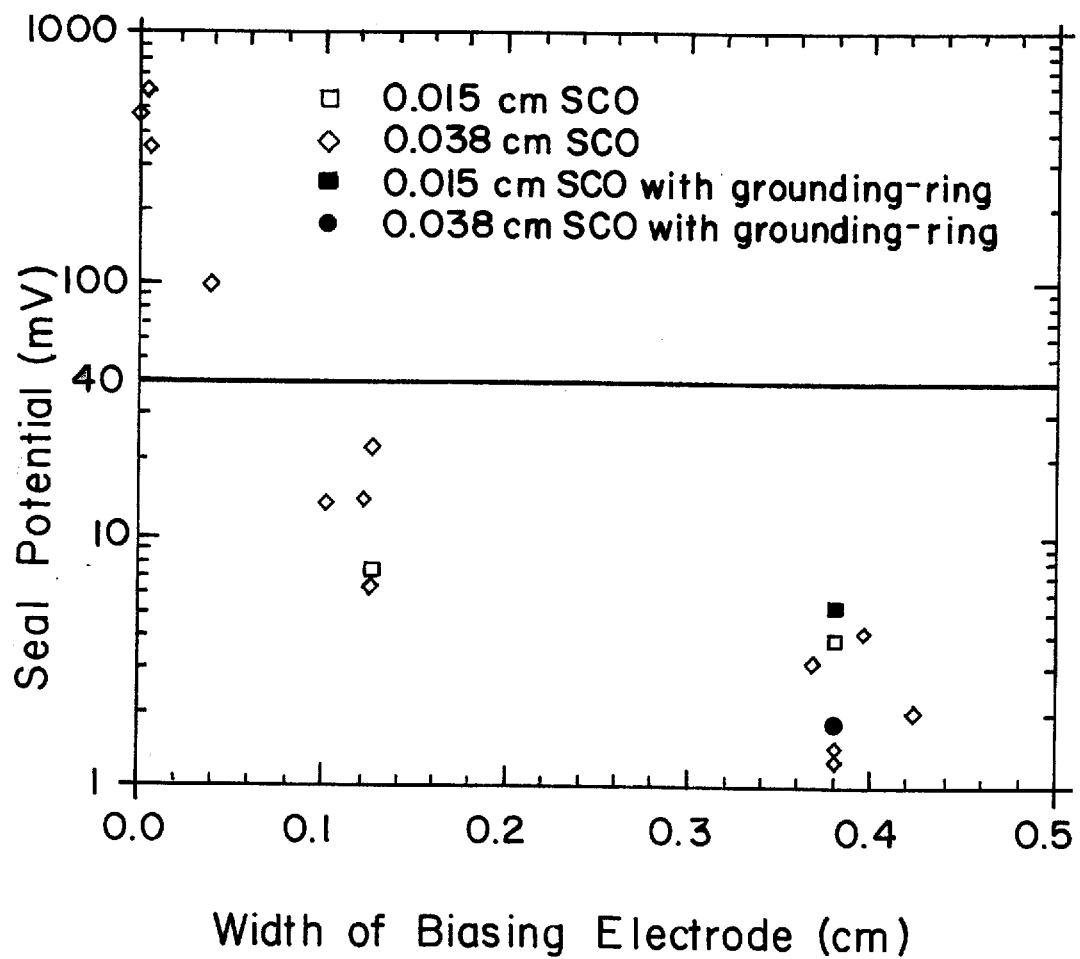
FIG. 14 is a plot of seal potential vs. width of biasing electrode for Example 6 in the Specification.

A fixed voltage of 0.7V was applied across the main electrodes at 750° C. in air, and the grounding ring (if present) and the LSM block (if present) were electrically connected to the anode. The seal potential was measured between the anode and the reference electrode for each test sample, and the seal potential as a function of biasing electrode width is plotted in FIG. 14. The plotted data clearly demonstrate that the use of a biasing electrode reduces the seal potential. Furthermore, the data indicate that a grounding ring is as effective in reducing the seal potential as an equivalently sized continuous extension of the anode, and that similar reductions in seal potential were obtained with 0.015 cm and 0.038 cm thick SCO electrolytes. This study demonstrates that for this particular geometry, temperature, and electrolyte material, a biasing electrode of at least about 0.05 cm in width is needed to maintain the stack anode seal potential below 40 mV when a voltage of 0.7V is applied across the cell. A biasing electrode of about 0.1 cm in width will maintain the anode seal potential at less than about 25 mV with 0.7V applied across the cell. The relationship of the seal potential to the width of the biasing electrode can be determined readily for other cell geometries, materials, and operating conditions by carrying out similar experiments.

EXAMPLE 7

Insulating material was prepared for use in cathode seals or in electrically insulating support material as described earlier. 81.2 grams magnesium oxide (Baker chromatographic grade 2477-5) and 18.8 grams aluminum oxide (Alcoa A-16 superground) powders were added to a polyethylene one liter jar (approximately half full of 12.5 mm diameter grinding media [high purity $ZrO_2$ (3 mol. % $Y_2O_3$)]) containing reagent grade liquids (92.3 grams toluene and 22.8 grams ethanol) and 0.5 grams dispersant (Witco Chemical grade PS-21 A). The slurry was mixed for 16 hours by rotating at 115 rpm. 55.0 grams of predissolved binder/plasticizer (18.0 grams polyvinyl butyral binder [Monsanto Grade Butvar B-79], 7.2 grams butyl benz phthalate plasticizer [Monsanto grade Santicizer S-160], 23.8 grams toluene, and 7.0 grams ethanol) was added and the slip was mixed for an additional 3 hours. The slurry was deaired in a vacuum desiccator and tape cast on 0.075 mm thick polyester film at a doctor blade height of 0.41 mm. The dried tape had a thickness of 0.14 mm. This MgO-18.8 wt. % $Al_2O_3$ tape was fired on an alpha-alumina setter using the following schedule: 20°–500° C. in 18 hours, 500°–1450° C. in 6 hours (2 hour hold at 1450° C.), 7 hours to 20° C. The sintered tape had a density of 3.50 g/cc or 97.8% of theoretical density (based on X-ray diffraction which showed that the only phases present were MgO and $MgAl_2O_4$). The calculated amount of $MgAl_2O_4$ formed was 26.3 volume percent. Multiple tapes were laminated into bar-shaped tape at a pressure of 25 MPa at 65° C. for one minute. These bars were sintered using the same schedule to the same density. Thermal expansion showed identical expansion/contraction between 20° and 1100° C. with both the SCO electrolyte and the lanthanum strontium manganite (LSM) interconnect materials.

EXAMPLE 8

SCO electrolyte material was prepared and cofired with insulating material from Example 7 to demonstrate bonding between the two materials. 279.4 grams cerium oxide (Rhone-Poulenc) and 26.6 grams strontium carbonate (Solvay) powders were added to a polyethylene one liter jar (approximately half full of 12.5 mm diameter grinding media [high purity $ZrO_2$(3 mol. % $Y_2O_3$)]) containing reagent grade liquids (64.2 grams toluene and 16.1 grams ethanol) and 2.6 grams dispersant (Witco Chemical grade PS-21A). The slurry was mixed for 16 hours by rotating at 115 rpm. 80.6 grams of predissolved binder/plasticizer (18.0 grams polyvinyl butyral binder [Monsanto Grade Butvar B-79], 7.2 grams butyl benzl phthalate plasticizer [Monsanto Grade Santicizer S-160], 23.8 grams toluene, and 6.0 grams ethanol) was added and the slip was mixed for an additional 3 hours. The slurry was deaired in a vacuum desiccator and tape cast on 0.075 mm thick polyester film at a doctor blade height of 0.41 mm. The dried tape had a thickness of 0.14 mm. This $CeO_2$/13.8 wt. % $SrCO_3$ tape was laminated to the MgO-18.8 wt. % $Al_2O_3$ tape from Example 7 at a pressure of 25 MPa at 65° C. for one minute. The laminated tape was fired on an alumina setter using the following schedule: 20°–500° C. in 18 hours, 500°–1540° C. in 9.5 hours (2 hour hold at 1540° C.), 8 hours to 20° C. The parts sintered well together with excellent bonding at the interface. Energy dispersive spectroscopy showed strontium migration from the SCO electrolyte into the magnesia/spinel insulating layer, presumably forming a strontium aluminate phase in the insulating layer.

Thus the present invention comprises several improvements in the design of planar electrolytic cell stacks which eliminate anode seal failure. One of these improvements is the radial offset of the anode and cathode seals such that the seals do not overlap on opposite sides of the electrolyte plate. This requires a specific cell design geometry as described above. Another improvement is the use of a biasing electrode on the anode side of the electrolyte plate which modifies or biases the electrolyte potential in the seal region such that current flow through the anode seal is minimized. This biasing electrode can be an extension of the anode beyond the outer edge of the cathode on the opposite side of the electrolyte plate. Alternatively or additionally, a separate biasing electrode can be placed on the electrolyte plate preferably between the anode and the anode seal. It has been found that a combination of offset seals and biasing electrodes is particularly effective in reducing or eliminating anode seal failure by controlling the potential across the anode seal at less than about 40 mV. Another feature of the invention is the insulating support placed between the cathode sides of the electrolyte and interconnect which eliminates potentially damaging stresses on electrolyte plate 29 when the gas pressure on the anode side of the electrolytic cell is greater than the gas pressure on the cathode side of the cell.

The improvements of the present invention are not limited to the stack geometries disclosed herein. Biasing electrodes and offset seals can be applied to alternative stack configurations having different methods for introducing feed gas into the stack, for withdrawing oxygen-depleted gas from the cathode sides of the cells, and/or withdrawing oxygen from the anode sides of the cells. In any application, biasing electrodes and offset seals can be utilized to control the potential across the anode seal below about 40 mV and preferably below about 25 mV.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:
1. A method for separating oxygen from an oxygen-containing gas which comprises:
    (a) contacting the oxygen-containing gas with a first surface of a planar solid electrolyte capable of transporting oxygen ions;
    (b) supplying electrons to the first surface of the planar solid electrolyte by a cathode in electrical contact with a portion of the first surface;
    (c) electrochemically reducing oxygen in the oxygen-containing gas by consuming electrons to produce oxygen ions;
    (d) transporting the resulting oxygen ions as current through the solid electrolyte by imposing an electrical potential across the solid electrolyte;
    (e) producing oxygen gas at a second surface of the solid electrolyte by consuming oxygen ions and producing electrons;
    (f) conducting the electrons of step (e) from the second surface by an anode in electrical contact with a portion of the second surface;

(g) conducting the electrons of step (f) from the anode by a gas impermeable electrically conducting interconnect which is in electrical contact with the anode;

(h) collecting the oxygen gas in a cavity bounded at least in part by the second surface of the solid electrolyte, the gas impermeable electrically conducting interconnect, and a gas-tight anode seal disposed between a portion of the second surface of the solid electrolyte and an opposing portion of the electrically conducting interconnect;

(i) withdrawing oxygen gas from the cavity;

(j) withdrawing an oxygen-depleted gas from contact with the first surface of the planar solid electrolyte; and (k) maintaining an anode seal potential below about 40 mV.

2. The method of claim 1 wherein the anode seal potential is maintained at less than about 40 mV by one or more biasing electrodes.

3. The method of claim 2 wherein at least one of the biasing electrodes is an extended portion of the anode.

4. The method of claim 3 wherein at least one of the biasing electrodes is separate from the anode.

5. The method of claim 2 wherein at least one of the biasing electrodes is separate from the anode.

6. The method of claim 2 wherein at least one of the biasing electrodes is disposed between the anode and the anode seal.

7. The method of claim 1 wherein the pressure of the oxygen gas generated at the second surface of the solid electrolyte is greater than the pressure of the oxygen-containing gas at the first surface of the solid electrolyte.

8. The method of claim 7 wherein the oxygen gas is withdrawn as a high purity pressurized product at a pressure at least 5 kPa greater than the pressure of the oxygen-containing gas.

9. The method of claim 1 wherein the oxygen-containing gas is air.

10. The method of claim 1 wherein the oxygen-containing gas is a gas containing less than 20.9 vol % oxygen.

11. The method of claim 10 wherein the oxygen-containing gas comprises argon and an argon product depleted in oxygen is withdrawn after contacting the oxygen-containing gas with the first surface of the solid electrolyte and after the oxygen is removed by reduction and transport across the solid electrolyte in steps (c) and (d).

12. The method of claim 11 wherein the argon product is obtained at a pressure equal to or greater than the pressure of the oxygen gas in the cavity of step (h).

* * * * *

UNITED STATES PATENT AND TRADEMARK OFFICE
CERTIFICATE OF CORRECTION

PATENT NO. : 5,868,918

DATED : Feb. 9, 1999

INVENTOR(S) : Stuart Adler et al.

It is certified that error appears in the above-identified patent and that said Letters Patent is hereby corrected as shown below:

Column 6, Line 41
  Delete "micrometer/(meter$\Omega$°C)" and substitute therefor
  -- micrometer/(meter·°C) --

Column 7, Line 11
  Delete "micrometer/(meter$\Omega$°C)" and substitute therefor
  -- micrometer/(meter·°C) --

Column 7, Line 26
  Delete "micrometer/(meter$\Omega$°C)" and substitute therefor
  -- micrometer/(meter·°C) --

Column 14, Line 21
  Delete "micrometer/(meter$\Omega$°C)" and substitute therefor
  -- micrometer/(meter·°C) --

UNITED STATES PATENT AND TRADEMARK OFFICE
CERTIFICATE OF CORRECTION

PATENT NO. : 5,868,918
DATED : Feb. 9, 1999
INVENTOR(S) : Stuart Adler et al.

It is certified that error appears in the above-identified patent and that said Letters Patent is hereby corrected as shown below:

Column 14, Line 22
  Delete "micrometer/(meterΩ°C)" and substitute therefor
  -- micrometer/(meter·°C) --

Column 14, Line 23
  Delete "micrometer/(meterΩ°C)" and substitute therefor
  -- micrometer/(meter·°C) --

Column 14, Line 55
  Delete "micrometer/(meterΩ°C)" and substitute therefor
  -- micrometer/(meter·°C) --

Signed and Sealed this

Twenty-fifth Day of May, 1999

Q. TODD DICKINSON

*Attest:*

*Attesting Officer*    Acting Commissioner of Patents and Trademarks